US010623789B1

(12) United States Patent
Spracklen et al.

(10) Patent No.: US 10,623,789 B1
(45) Date of Patent: *Apr. 14, 2020

(54) QUALITY EVALUATION OF MULTIMEDIA DELIVERY IN CLOUD ENVIRONMENTS

(71) Applicant: VMware, Inc., Palo Alto, CA (US)

(72) Inventors: Lawrence Andrew Spracklen, Boulder Creek, CA (US); Banit Agrawal, Cupertino, CA (US); Rishi Bidarkar, Sunnyvale, CA (US)

(73) Assignee: VMware, Inc., Palo Alto, CA (US)

( * ) Notice: Subject to any disclaimer, the term of this patent is extended or adjusted under 35 U.S.C. 154(b) by 21 days.

This patent is subject to a terminal disclaimer.

(21) Appl. No.: 15/606,684

(22) Filed: May 26, 2017

Related U.S. Application Data

(63) Continuation of application No. 13/079,972, filed on Apr. 5, 2011, now Pat. No. 9,674,562.

(60) Provisional application No. 61/452,493, filed on Mar. 14, 2011.

(51) Int. Cl.
*H04N 21/242* (2011.01)
*H04N 21/61* (2011.01)

(52) U.S. Cl.
CPC ....... *H04N 21/242* (2013.01); *H04N 21/6156* (2013.01)

(58) Field of Classification Search
CPC .......................... H04N 21/242; H04N 21/6156
See application file for complete search history.

(56) References Cited

U.S. PATENT DOCUMENTS

| 5,642,171 A | * | 6/1997 | Baumgartner | ......... G11B 27/10 |
| | | | | 348/515 |
| 5,815,572 A | * | 9/1998 | Hobbs | ................... H04N 7/1716 |
| | | | | 348/E7.059 |
| 5,933,155 A | | 8/1999 | Akeley | |
| 6,168,431 B1 | | 2/2001 | Narusawa et al. | |
| 6,381,362 B1 | | 4/2002 | Deshpande et al. | |
| 6,421,678 B2 | | 7/2002 | Smiga et al. | |
| 6,618,431 B1 | | 9/2003 | Lee | |
| 6,876,390 B1 | | 4/2005 | Nagata | |

(Continued)

OTHER PUBLICATIONS

U.S. Appl. No. 13/079,972, filed Apr. 5, 2011, Quality Evaluation of Multimedia Delivery in Cloud Environments, Spracklen et al.

(Continued)

*Primary Examiner* — Joshua D Taylor
(74) *Attorney, Agent, or Firm* — Fish & Richardson P.C.

(57) ABSTRACT

Methods, systems, and computer programs for measuring quality of multimedia delivery to a client are presented. A method includes operations for embedding video markers in a video stream of a multimedia stream, and embedding audio markers in an audio stream of the multimedia stream. The video stream and the audio stream are then transmitted separately to the client. Further, video markers received at the client are extracted from the transmitted video stream, and audio markers received at the client are extracted from the transmitted audio stream. A measure of the audio-video synchronization quality is obtained by determining a quantifiable time difference between the video stream and the audio stream received at the client, where the quantifiable time difference is calculated based on the extracted video markers and the extracted audio markers.

24 Claims, 10 Drawing Sheets

(56) References Cited

U.S. PATENT DOCUMENTS

| | | | |
|---|---|---|---|
| 7,155,681 B2 | 12/2006 | Mansour et al. | |
| 7,287,180 B1* | 10/2007 | Chen | G06F 11/2033 714/11 |
| 7,287,275 B2 | 10/2007 | Moskowitz | |
| 7,532,642 B1 | 5/2009 | Peacock | |
| 7,552,467 B2 | 6/2009 | Lindsay | |
| 7,593,543 B1 | 9/2009 | Herz et al. | |
| 7,752,325 B1 | 7/2010 | Yadav et al. | |
| 7,796,978 B2 | 9/2010 | Jones et al. | |
| 7,831,661 B2 | 11/2010 | Makhija et al. | |
| 8,166,107 B2 | 4/2012 | Makhija et al. | |
| 8,347,344 B2 | 1/2013 | Makhija et al. | |
| 8,788,079 B2 | 7/2014 | Spracklen | |
| 9,214,004 B2 | 12/2015 | Agrawal et al. | |
| 9,471,951 B2 | 10/2016 | Agrawal et al. | |
| 9,674,562 B1 | 6/2017 | Spracklen et al. | |
| 2001/0023436 A1 | 9/2001 | Srinivasan et al. | |
| 2002/0026505 A1 | 2/2002 | Terry | |
| 2002/0056129 A1 | 5/2002 | Blackketter et al. | |
| 2002/0138846 A1 | 9/2002 | Mizutani et al. | |
| 2002/0165757 A1 | 11/2002 | Lisser | |
| 2004/0022453 A1 | 2/2004 | Kusama et al. | |
| 2004/0073947 A1 | 4/2004 | Gupta | |
| 2004/0137929 A1 | 7/2004 | Jones et al. | |
| 2004/0184526 A1 | 9/2004 | Penttila et al. | |
| 2004/0221315 A1 | 11/2004 | Kobayashi | |
| 2005/0041136 A1 | 2/2005 | Miyata | |
| 2005/0138136 A1 | 6/2005 | Potter | |
| 2005/0187950 A1 | 8/2005 | Parker et al. | |
| 2005/0234715 A1 | 10/2005 | Ozawa | |
| 2005/0283800 A1 | 12/2005 | Ellis et al. | |
| 2006/0050640 A1 | 3/2006 | Jin et al. | |
| 2006/0059095 A1 | 3/2006 | Akins, III et al. | |
| 2006/0206491 A1 | 9/2006 | Sakamoto et al. | |
| 2007/0003102 A1 | 1/2007 | Fujii et al. | |
| 2007/0008108 A1* | 1/2007 | Schurig | G01S 5/0215 340/539.11 |
| 2007/0125862 A1 | 6/2007 | Uchiyama et al. | |
| 2007/0126929 A1 | 6/2007 | Han et al. | |
| 2007/0250920 A1 | 10/2007 | Lindsay | |
| 2007/0260870 A1* | 11/2007 | Nissan | H04L 29/06027 713/150 |
| 2007/0271375 A1 | 11/2007 | Hwang | |
| 2007/0291771 A1 | 12/2007 | Cline | |
| 2008/0022350 A1 | 1/2008 | Hostyn et al. | |
| 2008/0052783 A1 | 2/2008 | Levy | |
| 2008/0070589 A1* | 3/2008 | Hansen | G01S 5/0036 455/456.1 |
| 2008/0075121 A1 | 3/2008 | Fourcand | |
| 2008/0112490 A1 | 5/2008 | Kamijo et al. | |
| 2008/0117937 A1 | 5/2008 | Firestone et al. | |
| 2008/0204600 A1 | 8/2008 | Xu et al. | |
| 2008/0212557 A1 | 9/2008 | Chiricescu et al. | |
| 2008/0263634 A1 | 10/2008 | Kirkland | |
| 2008/0297603 A1 | 12/2008 | Hurst | |
| 2008/0310368 A1* | 12/2008 | Fischer | H04W 36/02 370/331 |
| 2009/0100164 A1 | 4/2009 | Skvortsov et al. | |
| 2009/0210747 A1 | 8/2009 | Boone | |
| 2009/0216975 A1 | 8/2009 | Halperin et al. | |
| 2009/0217052 A1 | 8/2009 | Baudry et al. | |
| 2009/0259941 A1 | 10/2009 | Kennedy, Jr. | |
| 2009/0260045 A1 | 10/2009 | Karlsson et al. | |
| 2009/0268709 A1 | 10/2009 | Yu | |
| 2010/0161711 A1 | 6/2010 | Makhija et al. | |
| 2010/0162338 A1 | 6/2010 | Makhija | |
| 2010/0246810 A1 | 9/2010 | Srinivasan et al. | |
| 2010/0306163 A1 | 12/2010 | Beaty et al. | |
| 2011/0023691 A1 | 2/2011 | Iwase et al. | |
| 2011/0047211 A1 | 2/2011 | Makhija | |
| 2011/0051804 A1 | 3/2011 | Chou et al. | |
| 2011/0078532 A1* | 3/2011 | Vonog | G06F 3/1454 714/752 |
| 2011/0103468 A1 | 5/2011 | Polisetty et al. | |
| 2011/0134763 A1 | 6/2011 | Medina et al. | |
| 2011/0138314 A1 | 6/2011 | Mir et al. | |
| 2011/0179136 A1 | 7/2011 | Twitchell, Jr. | |
| 2011/0188704 A1 | 8/2011 | Radhakrishnan et al. | |
| 2011/0224811 A1 | 9/2011 | Lauwers et al. | |
| 2011/0238789 A1 | 9/2011 | Luby et al. | |
| 2012/0036251 A1 | 2/2012 | Beaty et al. | |
| 2012/0066711 A1* | 3/2012 | Evans | H04N 21/6156 725/32 |
| 2012/0073344 A1 | 3/2012 | Fabris | |
| 2012/0081580 A1 | 4/2012 | Cote et al. | |
| 2012/0113270 A1 | 5/2012 | Spracklen | |
| 2012/0140935 A1 | 6/2012 | Kruglick | |
| 2012/0167145 A1 | 6/2012 | Incorvia et al. | |
| 2012/0246225 A1 | 9/2012 | Lemire | |
| 2014/0320673 A1 | 10/2014 | Agrawal et al. | |
| 2014/0325054 A1 | 10/2014 | Agrawal et al. | |
| 2014/0328203 A1 | 11/2014 | Spracklen | |
| 2016/0098810 A1 | 4/2016 | Agrawal et al. | |
| 2016/0255400 A1 | 9/2016 | Agrawal et al. | |
| 2017/0011486 A1 | 1/2017 | Agrawal et al. | |

OTHER PUBLICATIONS

U.S. Appl. No. 13/212,054, filed Aug. 17, 2011, Measurement of Streaming—Audio Quality, Mehta.

"Port Forwarding." Wikipedia. Published Feb. 15, 2010. Retrieved from the internet: URL<http://web.archive.org/web/20100215085655/http://en.wikipedia.org/wiki/Port_forwarding>. 3 pages.

Larsen, Vegard. *Combining Audio Fingerprints*. Norwegian University of Science and Technology, Department of Computer and Information Science. Published Jun. 2008. 151 pages.

* cited by examiner

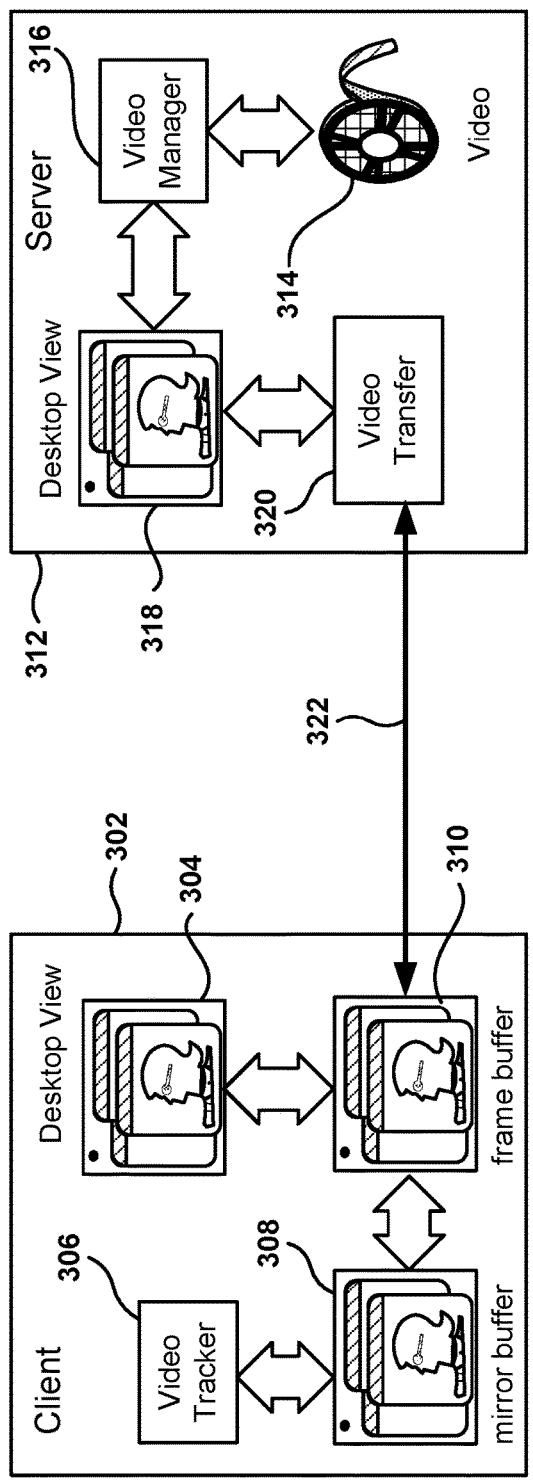
Fig. 3
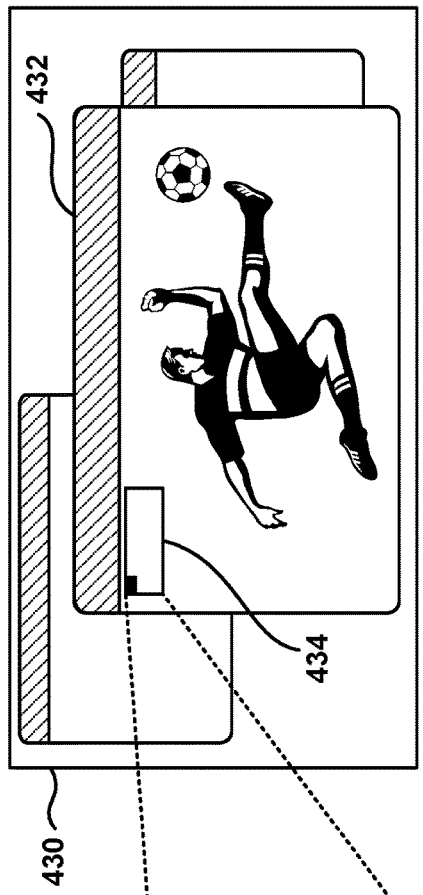
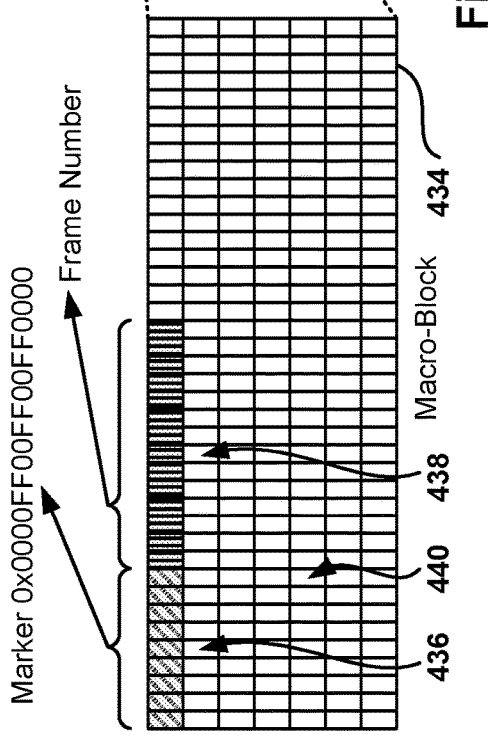
Fig. 4

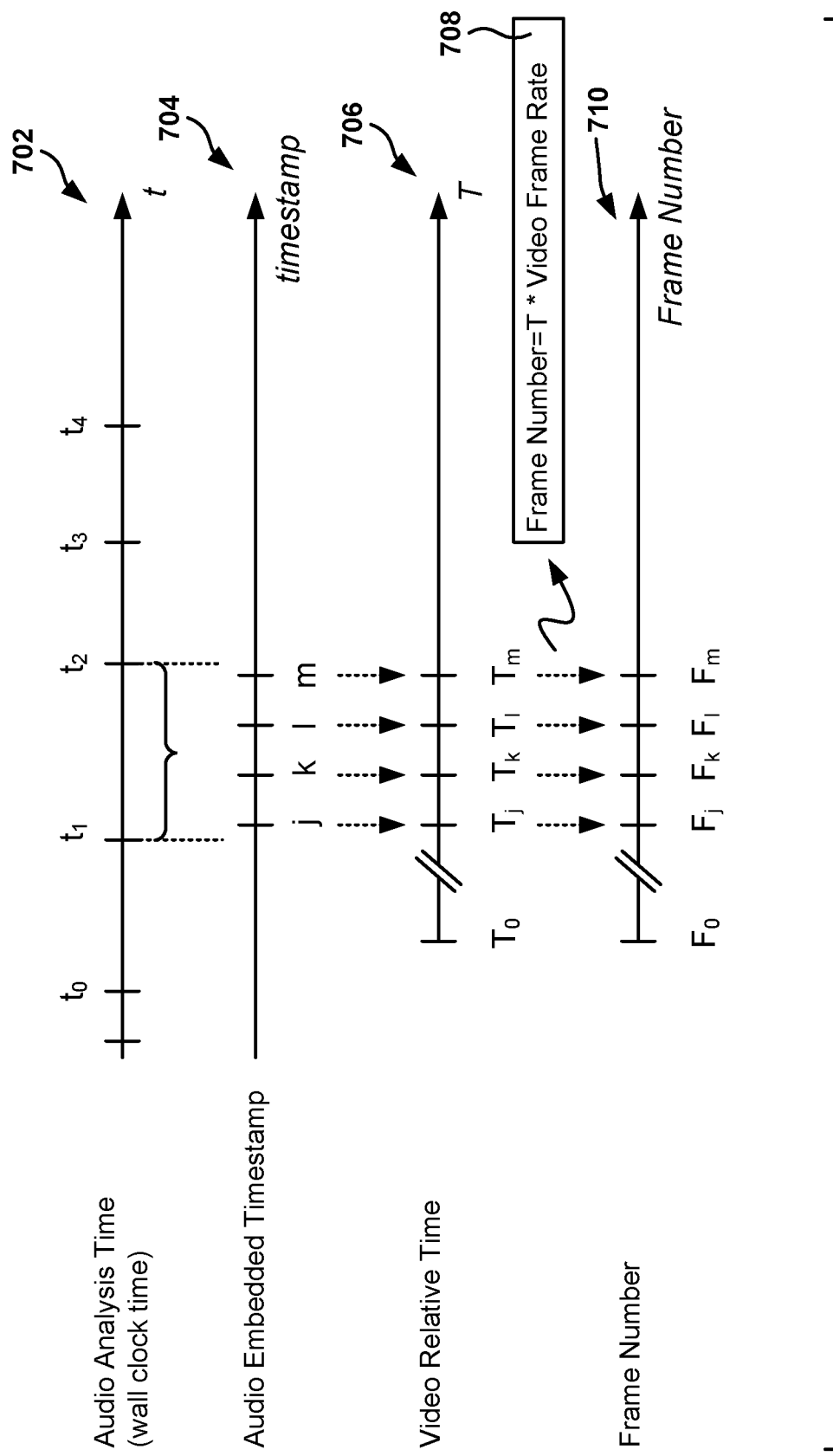

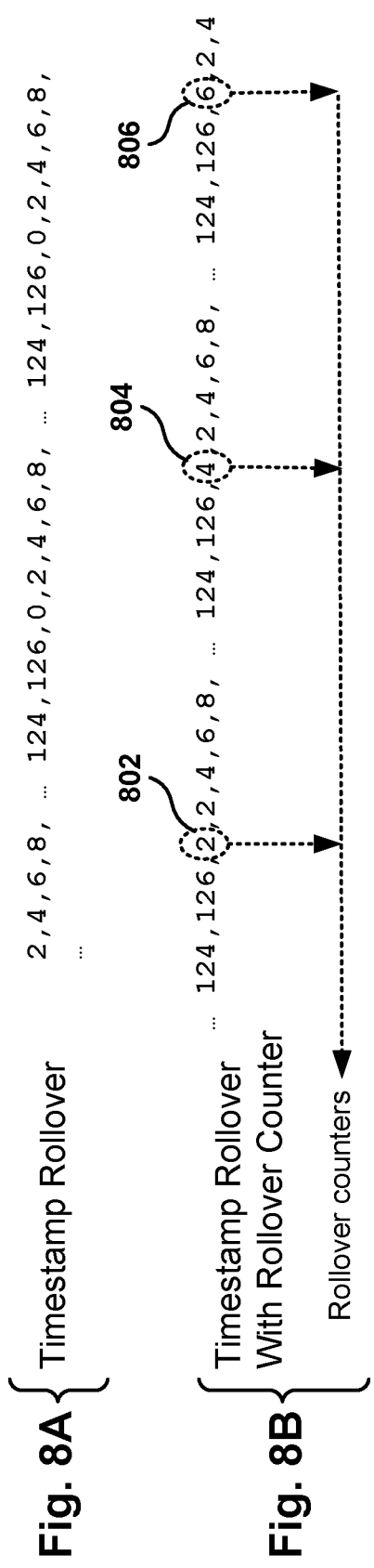
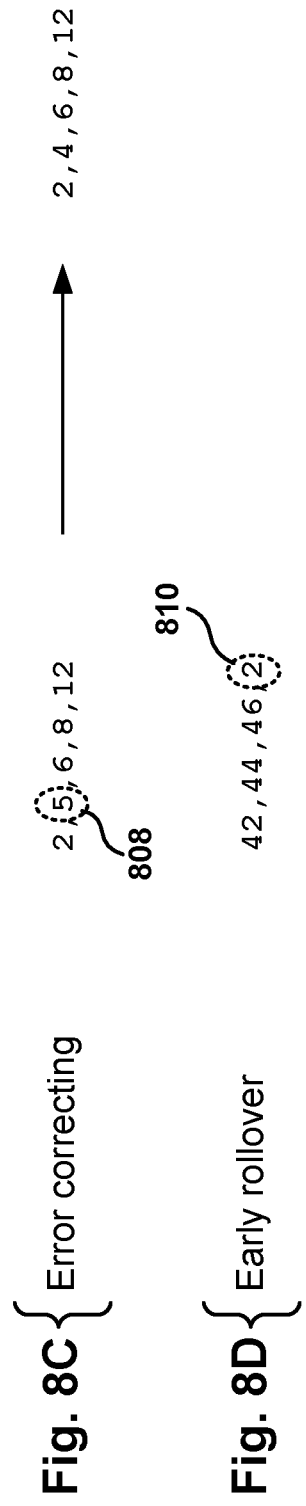
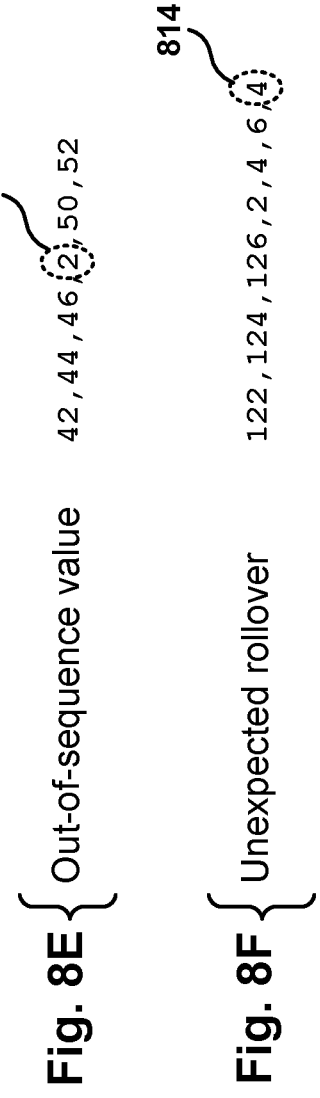
Fig. 8A Timestamp Rollover
Fig. 8B Timestamp Rollover With Rollover Counter
Fig. 8C Error correcting
Fig. 8D Early rollover
Fig. 8E Out-of-sequence value
Fig. 8F Unexpected rollover

US 10,623,789 B1

QUALITY EVALUATION OF MULTIMEDIA DELIVERY IN CLOUD ENVIRONMENTS

CROSS REFERENCE TO RELATED APPLICATIONS

This application is a continuation application of, and claims priority to, U.S. patent application Ser. No. 13/079,972, filed on Apr. 5, 2011, and which is incorporated here by reference. This application claims the benefit of earlier-filed U.S. Provisional Patent Application 61/452,493 filed Mar. 14, 2011 and entitled, "Quality Evaluation of Multimedia Delivery in Cloud Environments," which is incorporated herein by reference in its entirety.

This application is related by subject matter to U.S. Pat. No. 7,831,661, issued Nov. 9, 2010, and entitled "MEASURING CLIENT INTERACTIVE PERFORMANCE USING A DISPLAY CHANNEL;" U.S. application Ser. No. 12/337,895, filed on Dec. 18, 2008, and entitled "MEASURING REMOTE VIDEO PLAYBACK PERFORMANCE WITH EMBEDDED ENCODED PIXELS;" and U.S. application Ser. No. 12/942,393, filed on Nov. 9, 2010, and entitled "MONITORING AUDIO FIDELITY AND AUDIO-VIDEO SYNCHRONIZATION," which are all incorporated herein by reference.

BACKGROUND

In typical virtualized desktop infrastructure architectures, user displays and input devices are local, and applications execute remotely in a server. Because applications execute remotely, a latency element is introduced due to the network travel time and the application response time. One method for assessing the performance of remote applications is by measuring the response times for various events. These response times are the result of aggregating latency across different components in the architecture. Measuring these latencies, however, is a challenge as measurements must encompass latencies related to both the low level events (such as mouse movements) and the high level events (application launches), as well as work across network boundaries and a range of client devices.

Virtual Desktop Infrastructure (VDI) deployments are rapidly becoming popular. In VDI deployments, a user's desktop is typically hosted in a datacenter or cloud, and the user remotely interacts with her desktop via a variety of endpoint devices, including desktops, laptops, thin clients, smart phones, tablets, etc. There is a wide variety of advantages to this approach, including cost savings, improved mobility, etc. However, for VDI environments to become ubiquitous, the user should not be constrained in the type of application that can be successfully run. Accordingly, it is necessary to ensure that, when required, sufficient computational resources are made available in the data center, and, without comprising quality, there is sufficient network bandwidth to transmit the desired imagery and audio to the user's endpoint device. In order to ensure proper quality of delivery, it is necessary to automatically monitor video quality, audio quality, and the synchronization of audio and video.

SUMMARY

Embodiments of the present invention provide methods, systems, and computer programs for measuring quality of multimedia delivery to a client. It should be appreciated that the present invention can be implemented in numerous ways, such as a process, an apparatus, a system, a device or a method on a computer readable medium. Several inventive embodiments of the present invention are described below.

In one embodiment, a method includes operations for embedding video markers in a video stream of a multimedia stream, and embedding audio markers in an audio stream of the multimedia stream. The video stream and the audio stream are then transmitted separately to the client. Further, video markers received at the client are extracted from the transmitted video stream, and audio markers received at the client are extracted from the transmitted audio stream. A measure of the audio-video synchronization quality is obtained by determining a quantifiable time difference between the video stream and the audio stream received at the client, where the quantifiable time difference is calculated based on the extracted video markers and the extracted audio markers.

In another embodiment, a computer client includes a memory; a processor; a video performance agent; an audio performance agent; and a video and audio performance agent. The video performance agent is executed by the processor and is operable to extract video markers embedded in a received video stream of a multimedia stream. The audio performance agent is executed by the processor and is operable to extract audio markers embedded in a received audio stream of the multimedia stream, where the video stream and the audio stream are transmitted separately to the computer client. Further, the video and audio performance agent, executed by the processor, is operable to determine a quantifiable time difference between the video stream and the audio stream received at the client, based on the extracted video markers and the extracted audio markers.

In yet another embodiment, a non-transitory computer readable medium having program instructions that, when executed by a computer, implement a method for measuring quality of multimedia delivery to a client. The method includes operations for embedding video markers in a video stream of a multimedia stream, and for embedding audio markers in an audio stream of the multimedia stream. In another method operation, the video stream and the audio stream are transmitted separately to the client. The video markers received at the client are extracted from the transmitted video stream, and the audio markers received at the client are extracted from the transmitted audio stream. A quantifiable time difference between the video stream and the audio stream received at the client is determined, based on the extracted video markers and the extracted audio markers.

Other aspects of the invention will become apparent from the following detailed description, taken in conjunction with the accompanying drawings, illustrating by way of example the principles of the invention.

BRIEF DESCRIPTION OF THE DRAWINGS

The invention may best be understood by reference to the following description taken in conjunction with the accompanying drawings in which:

FIG. 3 shows an architecture for measuring video performance using information sent on the video channel and detected on a mirror buffer, in accordance with one embodiment.

FIG. 4 illustrates an embodiment for transmitting encoded information in the pixels of a video communication.

FIG. 7 illustrates a method for calculating video frame numbers associated with audio markers, according to one embodiment.

FIGS. 8A-8F illustrate several embodiments for error detection and correction of timestamps embedded in a digital audio stream.

DETAILED DESCRIPTION

Methods, systems, and computer programs for measuring quality of multimedia delivery to a client are presented. It should be recognized that the present invention may be practiced without some or all of these specific details. In other instances, well known process operations have not been described in detail in order not to unnecessarily obscure the present invention.

Figure 1:
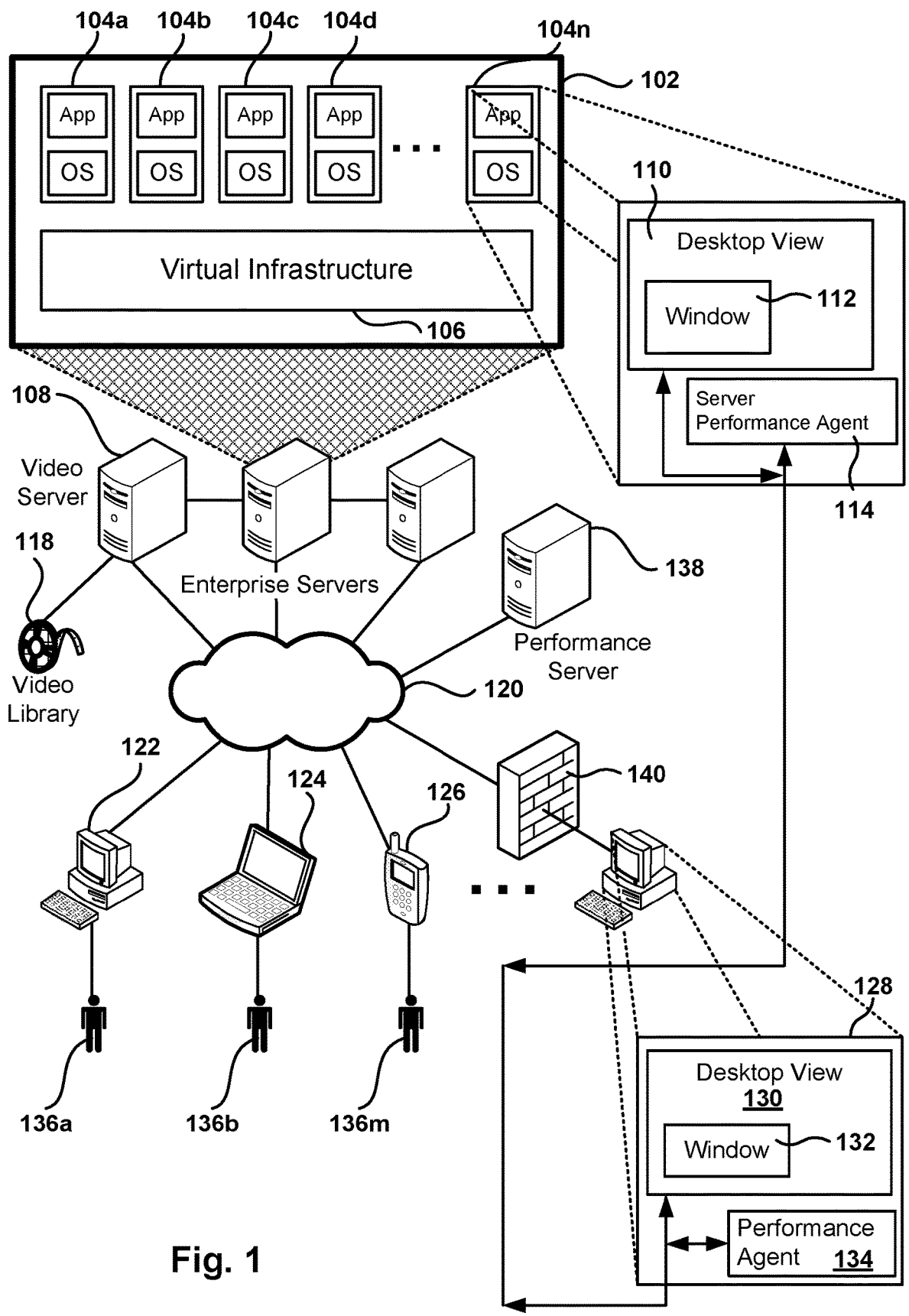
FIG. 1 depicts a remote desktop environment including virtual machine servers, also referred to as enterprise servers, according to one embodiment.

FIG. 1 depicts a remote desktop environment including virtual machine servers, also referred to as enterprise servers, according to one embodiment. The environment depicted in FIG. 1 includes enterprise servers 102, which provide virtual desktop services to remote users 136a-m. Although embodiments of the present invention are described within a virtual desktop system, the embodiments presented herein can be used in other environments with a remote multimedia application transmitting audio and video data to a remote client.

In one embodiment, performance server 138 is also part of virtualization server 100. Performance server 138 collects performance data from servers and clients, and analyzes the data collected for presentation to a user. Video server 108, having access to video library 118, provides multimedia delivery services for the desktops in the system. Alternatively, multimedia is delivered to the desktop from other sources, such as an internet website. Performance server 138 may provide multimedia delivery quality metrics for any type of multimedia.

Virtual infrastructure layer 106 connects virtual machines (VM) 104a-n in enterprise server 102 to remote users. Remote users 136a-m are connected to computers 122, 124 and 126 acting as clients in the virtual infrastructure. Computers 122, 124, and 126 provide input/output capabilities associated with virtual machines 104a-n, where the capabilities include, at least, video presentation on a display and audio reproduction in one or more speakers. Clients may include PC 122, laptop 124, a tablet, mobile phone 126, etc. Clients communicate with virtualization server 102 via network 120, and a firewall 140 may be present between servers and clients, affecting the delivery of multimedia to the client.

Virtual machines 104a-n include a Guest Operating System (GOS) supporting applications that execute on the GOS. A different view of virtual machine 104n includes desktop view 110, window 112, and server performance agent 114. Server performance agent 114, a process executing in the VM, manages the measurement of audio and video performance on remote desktops. Remote desktop 128 includes desktop view 130, which delivers the video to the remote desktop, and performance agent 134, which measures the audio and video quality and is in communication with server performance agent 114. Desktop view 130 includes windows 132.

In one embodiment, Virtual Machine 104n communicates with the associated local client over network 120 using a remote display protocol. One example can be Remote Desktop Protocol (RDP) available from Microsoft® Inc. Remote Desktop Protocol is a multichannel-capable protocol that supports separate virtual channels for carrying presentation data, serial device communication, licensing information, highly encrypted data (keyboard, mouse activity), etc.

Embodiments of the multimedia quality evaluation system described herein measures the performance of the virtual environment as seen by users 136a-m. The embodiments presented herein are independent of the communications protocols used to transfer audio and data, thus being able to reliably obtain performance measurements under different topologies and protocols, and to assess the different factors that affect virtual desktop performance. Additionally, the embodiments presented can scale to tens of thousands of clients and servers without unduly burdening the virtual infrastructure.

Embodiments of the invention monitor multimedia delivery for one or more desktops. When a large number of desktops are monitored (e.g., one thousand desktops), statistical analysis is performed to combine the performance metrics obtained for each of the desktops, obtaining quantitative date about the overall system performance—i.e., Quality of Service (QOS)—of the multi-desktop environment. For example, performance metrics may indicate that "95 percent of desktops have an Audio/Video (A/V) synchronization that is better than 0.1 seconds, and 99 percent of desktops have an A/V synchronization better than 0.3 seconds." The results provide actual quantitative data, and are not based on subjective performance measurements provided by users.

The results of the statistical analysis may be used to manage the data center by identifying possible performance problems and assigning resources to solve these performance problems. In one embodiment of a multimedia quality evaluation system, the desktops may be simulated using a simulation program in conjunction with a VDI deployment, such as VMware® View™, available from VMware, Inc. of Palo Alto, Calif. Multiple desktops can be spawned in a simulation, and the performance measurements taken on the desktops, as described in more detail below. The performance metrics may be used by computing service providers to prove compliance with Service Level Agreements (SLA) contracted with a customer, and sometimes referred to as desktop as a service (DaaS).

Figure 2:
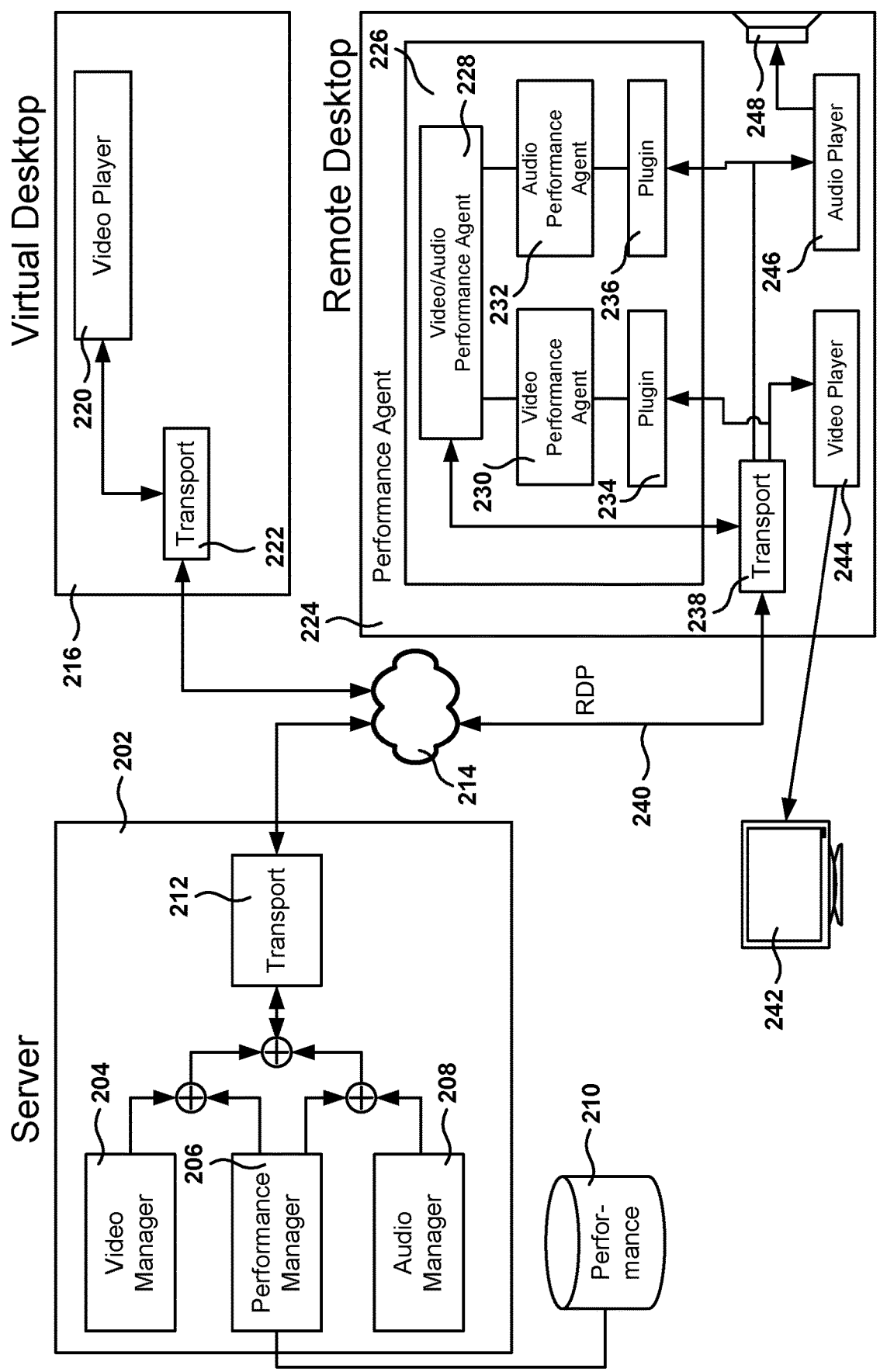
FIG. 2 illustrates the embedding of information, for performance measurement purposes, in transmitted audio and video, according to one embodiment.

FIG. 2 illustrates the embedding of information, for performance measurement purposes, in transmitted audio and video, according to one embodiment. In the VDI environment, applications such as high definition (HD) video, webcasts, and video conferences may consume significant CPU and network bandwidth. In some instances, the lack of resources can result in an unsatisfactory experience for end-users. Focusing on audio delivery, quality not only means ensuring that the audio fidelity remains acceptable, but that the audio playback remains closely synchronized with the associated video stream. In many VDI protocols, there is no tethering between the audio and the video streams, so noticeable lack of synchronization is possible. To ensure that these undesirable events are not encountered in a VDI deployment, attention needs to be paid to the provisioning within the datacenter. In addition, the VDI transport protocols, used to convey the display images and audio to the endpoint, have to be carefully tailored to ensure that quality degrades gradually when CPU or network bandwidth constraints are encountered.

To accurately measure audio and video fidelity, as perceived on the endpoint device, it is necessary to examine the audio and video streams received at the endpoint, and ascertain how close in time the received audio stream matches the original audio stream, how closely the image frames from the received video stream match the corresponding image frames of the original video stream, and how a user would perceive the differences. If a user is sitting at her desktop listening to a local audio stream, how does that experience compare with the experience in the VDI environment? The following factors may have an impact on audio or video delivery:

CPU constraints on the host, which can impact how fast the audio can be decoded and readied for sending to the endpoint device;

Network constraints, which can result in loss or delay of data; and

Lossy compression in the transport protocol, which reduces network bandwidth consumption. For example, the audio can be compressed by the VDI transport protocol (e.g., PC over IP [PCoIP®] available from Teradici, Inc., RDP, or others) and impact the audio quality. The lossy compression techniques can include standard compression techniques such as Adaptive Differential Pulse-Code Modulation (ADPCM), or more intrusive techniques such as down sampling.

Embodiments of the invention embed markers within audio and video streams to measure audio quality, video quality, and A/V synchronization. The markers provide end-to-end timing protection. The architecture shown in FIG. 2 may be used for estimating audio and video performance on real-world deployments, as well as in testing environments.

In various embodiments, performance server 202, which corresponds to performance server 138 in FIG. 1, in addition to gathering multimedia performance metrics for use by an administrator, has access to the multimedia stream, which includes an audio stream and a video stream, to be delivered to desktop 216. The media can reside in a storage device (not shown) attached to server 202, or can be downloaded or streamed from a media server. Video manager 204 prepares the video for delivery to desktop 216, and audio manager 208 prepares the audio for delivery. In some environments, the video and the audio manager reside in the same process, and in other environments, the video and audio managers are implemented by separate programs or processes. Performance server 202 in various embodiments, adds timestamps to audio and video streams as described below, and send the modified streams to virtual desktop 216 or directly to remote desktop 224, in alternate embodiments.

Performance manager 206 intercepts the audio or video signal, before is sent out to transport module 212, and adds information to the audio or video signal for performing quality measurements. In one embodiment, the information added includes markers with video frame number information or time information. Performance manager uses wall-clock timing (i.e., actual time progress) to ensure that video manager 204 and audio manager 208 generate data at appropriate rates, for example to make sure that audio and video are synchronized or that the audio signal transmitted is for audio that will play at the appropriate speed at the client. In one embodiment, the functions of performance manager 206 are incorporated into video manager 204 or audio manager 208 (e.g., by the use of a plugin), which allows a tighter integration of the performance tracking with the actual decoding/playback of the audio or video. Transport module 212 delivers the signal through network 214 to the remote desktop 224. In some cases, the signal has to go through a firewall. By incorporating the performance markers within the audio signal, the performance markers are not blocked by firewalls.

The embedding of markers in the audio and video streams by performance manager 206 is just one way of performing marker insertion. In other embodiments, markers may be inserted by one or more computing devices from a plurality of computing devices, such as a dedicated video server, a dedicated performance server, a virtual infrastructure server, a network device (which inserts markers while the video stream is in transit), a personal computer, a tablet device, a laptop, a smart phone, etc. In addition, the markers may be inserted at different stages of the delivery of video and audio to the remote desktop. For example, markers may be inserted before a multimedia file is transmitted, after the multimedia file is received at a client but before separately transmitting the audio and the video to a remote desktop, in the files stored in a video library, while transferring a multimedia file, etc. Further, the video markers and the audio markers do not have to be inserted at about the same time, as they may be inserted by different modules and at different times. In summary, the markers may be inserted in the video and audio stream in a plurality of ways, as long as the markers are inserted before the video and the audio streams are delivered to the remote desktop. Thus, the embodiments presented here for inserting markers are exemplary and not meant to be limiting.

In one embodiment, such as in a test environment, the timestamps are introduced into the audio or video files in advance (offline), and performance manager 206 does not intercept or modify the outgoing audio and video streams. In another embodiment, remote desktop 224 is a "test VM" in a production environment, allowing network administrators to determine prevailing audio/video conditions without modifying or impacting the user's multimedia delivery. The test VM has no actual user and is configured specifically for automatically accessing and evaluating multimedia content for audio/video synchronization error.

Virtual desktop 216 includes video player 220, which receives the multimedia stream via transport 222 and delivers the multimedia to the user. Remote desktop 224 provides remote terminal services for virtual desktop 216. Remote desktop 224 provides a user interface (not shown), which typically includes a windows environment with video player 244 (which delivers the video to display 242), and audio player 246 (which delivers the audio to one or more speakers 248). The signal sent from transport 212 in server 202, via network 214, is received by transport module 238 at remote desktop 224. The signal is then processed by the audio or video player to deliver audio or video to the user.

Performance agent 226 in remote desktop 224 examines the incoming audio and video streams to calculate performance metrics. Performance agent includes video/audio performance agent 228, video performance agent 230, plugin 234 (which obtains a copy of the incoming video), audio performance agent 232, and plugin 236 (which obtains a copy of the incoming audio). The multimedia signal is examined by video performance agent 230 and audio performance agent 232. Video performance agent 230 has access to the incoming video data via plugin 234, which interfaces with the underlying operating system or computing environment to access the incoming video. Similarly, audio performance agent 232 accesses the incoming audio data via plugin 236, which interfaces with the underlying operating system or computing environment.

Video Performance agent 230 examines the incoming video to extract encoded information from the video stream. In one embodiment, the encoded information, also known as video markers, includes the video frame number. Similarly, audio performance agent 232 examines the incoming audio stream to extract encoded information. In one embodiment, the encoded information includes timestamps indicating the time progress of the audio stream. Video/Audio performance agent 228 determines quantifiable data regarding the synchronization between the incoming video and audio streams. More details about the calculation of performance metrics is given below with reference to FIG. 6.

Performance manager 206 and performance agent 226 cooperate in the computation of performance metrics, which can be performed by either one of them. The performance measurements and the quality metrics are available for display to a user or system administrator, and in one embodiment the performance measurements and the quality metrics are stored in performance database 210.

In some environments, the video and audio streams are sent together to the remote clients, such as when using Adobe® Flash® Player. In other embodiment, RDP is utilized to deliver the video and the audio streams to the remote desktop. The video and audio streams are sent separately, thus the video and audio are subject to losing synchronization as the video data and the audio data, that are supposed to be played synchronously, may arrive at different times.

It is noted that the embodiments illustrated in FIG. 2 are exemplary. Other embodiments may utilize different modules, or some modules may perform the functionality of several of the modules shown in FIG. 2. The embodiments illustrated in FIG. 2 should therefore not be interpreted to be exclusive or limiting, but rather exemplary or illustrative.

FIG. 3 shows an architecture for measuring video performance using information sent on the video channel and detected on a mirror buffer, in accordance with one embodiment. Video server 312 generates a virtual desktop view 318 of a video display, which is transferred to client 302. Video manager 316 access video library 314 to obtain the required video information, and plays the video for remote client 302. Video transfer module 320 communicates with remote client 302 to transfer the video data over communication channel 322. In one embodiment, the video data is sent in the form of video updates, but other methods for transferring video data are possible.

At client 302, frame buffer 310 drives a video display (not shown) using a memory buffer containing a complete frame of data for client's desktop view 304. The information in the buffer typically consists of color values for every pixel on the screen.

To accurately measure quality and latency of remote video playback, knowing which frames are received on the client side and the time of arrival is critical. This is difficult to do in the network layer as packets may not have information on video frames. Embodiments of the present invention use information on the display driver, where all the updates are being rendered, since all the video frames are being rendered to display device frame buffer 310. Server 312 generates customized videos with encoded embedded information. In one embodiment, the encoding includes a marker and video meta-data. The marker can be a known sequence of video pixels, also referred to herein as magic pixels, and the video meta-data provides information on the video frame, such as frame number. One embodiment for encoding video meta-data is described below with reference to FIG. 4. Other information that can be included in the video meta-data may include a timestamp, identification of the application generating the video image, server identification (e.g. name, IP address, etc.), video information (screen size, resolution, encoding, etc.), compression information, proxy server information, web server, etc.

In one embodiment, the marker and the meta-data are included in each frame, and in other embodiment, the marker and meta-data are included periodically, such as for example one out of every 2 frames. The frequency for embedding frame information can be adjusted over time, such as for example a higher frequency at the beginning of video delivery, and a lower frequency after a predefined initial period. Additionally, the frequency can be adjusted depending on environmental factors, such as the application running the video, the video resolution, the network bandwidth of the client or server, etc. Although the sampling of frames does not produce a performance metric as accurate as the examining of every frame, the performance measurements with sampling can be almost as accurate if the number of frames examined is large. For example, if only frames with even frame numbers are added markers, after examining a large number of even frames, such as 1,000 frames, and the method calculates that five percent of even frames are lost during video transmission, then it is reasonable to extrapolate this metric and assume that the overall drop rate (for both even and odd number frames) is five percent. Sampling results in computing resource savings, by decreasing the amount of processing required for the transmitted video frames.

As video frames come in, the video data is examined and if the encoded information is found, then the frame number and arrival time is recorded for the video frames. This approach works well for lossless compression where there are no changes in the value of markers and frame number pixels. However, the approach does not work correctly in case of lossy compression as the markers and meta-data can change during transmission due to compression and decompression. In one embodiment, value ranges around expected pixel values are used in order to compensate for transmission losses.

Mirror buffer 308 holds a copy in memory of frame buffer 310 to lower the amount of processing required by video tracker 306 to scan for encoded pixels. Display mirroring technology is widely employed by remote desktop applications such as: NetMeeting, PC Anywhere, VNC, Webex, etc. Mirroring performs better than primitive screen grabbing, because mirroring allows the capture of only the minimally updated regions of the display and retrieves data directly, bypassing the intermediate copy. One example of a mirror buffer commercially available is DFMirage™, a video driver mirroring technology available from DemoForge™ for the Windows NT operating system (OS) family. DFMirage is a driver for a virtual video device managed at the DDML level of the graphics system that exactly mirrors the drawing operations of one or more physical display devices. In another embodiment, video tracker 306 inspects frame buffer 310 directly without using a mirror buffer.

Video delivery may include MultiMedia Redirection (MMR), where software modules at the client and the server work intelligently to redirect multimedia processing tasks dynamically between the client and server. The multimedia stream is decoded locally on the client using the local processing power of the device thereby providing complete multimedia playback capabilities overcoming any limitations that are inherent in traditional thin computing architectures. The multimedia stream is decoded on the client thereby freeing up the processing power on the server. In one embodiment where MMR is used, the video tracker analyzes the video data once the MMR component at the client decodes the video data. The method can also be used if Adobe Flash redirection is used, by analyzing video frame information after the video information is decoded at the client.

In another embodiment, video performance measurements are taken under different server or client loads to analyze how the availability of computer resources (such as CPU, memory, etc.) affects video delivery. For example, video performance measurements are made for a server running a web hosting application, and for the same server when web hosting is not operational. The results are compared to analyze how web hosting impacts the delivery of video from the same server.

FIG. 4 illustrates an embodiment for transmitting encoded information in the pixels of a video communication. Encoded macro-block 434 is embedded inside window 432 of display 430. Macro block 434 includes marker 436, meta-data 438, and filler 440. In one embodiment, macro block 438 has a size of about 100 pixels, but other values are also possible. It should be appreciated that macro block 434 in FIG. 4 is an exemplary arrangement and other embodiments may utilize different components, a subset of the components, or the same components in different order. The embodiment illustrated in FIG. 5 should therefore not be interpreted to be exclusive or limiting, but rather exemplary or illustrative.

Pixels inside macro block 434 can have one of three values according to one embodiment:
1. Red <0xff0000>;
2. Green <0x00ff00>; or
3. Blue <0x0000ff>.

These three particular colors have bytes components that are either 0xff or 0x00. Even if there is a lossy compression in a particular protocol, the final color value after decompression would not change drastically, because the protocol has to provide a similar-looking screen on the client side. For example, if byte 0x00 changes to 0x3a after decompression, an appropriate deviation threshold can be utilized to mask this undesired noise. In one embodiment, the deviations from the expected values are recorded as an additional measure of the quality of the video received.

Video metadata 438 is encoded in similar fashion. In one embodiment, a frame number is encoded using bytes 0xff or 0x00. Each bit of the frame number is encoded in one byte. For example, if the maximum frame number can be represented in n bits, then the bit wise representation of the frame number is noted as $\{b_0 b_1 \ldots b_n\}$. If bit b has a binary value of 1, then $b_i$ is encoded as 0xff and if $b_i$ has a binary value of 0, then $b_i$ is encoded as 0x00. Thus, each frame number is encoded as a sequence of byte values of 0xff or 0x00. This encoding is useful when reconstructing the frame numbers on the client side since the appropriate thresholds are used to mask noise that was generated in lossy compression, or noise generated due to any other reason. In other embodiment, each bit is encoded in a plurality of bytes from the pixel data. In yet another embodiment, each bit of information is encoded in one sub-pixel of the pixel data. The sub-pixel is represented as an intensity value for a color component of one pixel. Typically, the sub-pixel defines intensity information for a red, green, or blue component of the pixel. For 24-bit "Truecolor" where each sub-pixel is encoded as one byte (8 bits) of pixel data, then each bit is encoded in one byte, but if the sub-pixel requires a different amount of storage, then each bit would be encode using the amount of storage required for the sub-pixel. For example, in 16-bit "Highcolor," the red and blue sub-pixels may be encoded with 5 bits of data each, whereas the green sub-pixel is encoded with 6 bits.

Some video and image compression algorithms rely on a technique known as chroma subsampling, wherein chroma, or color information, is sampled at a lower resolution than the luma, or brightness information. In this case, using sub-pixel information might be unreliable for individual pixel data. Where chroma subsampling is used, each bit of information may be encoded using an overall intensity of the pixel, rather than discriminating on the basis of sub-pixel information. In this case, white and black pixels may be used so that each pixel correlates to one bit of information. Various techniques can be implemented to obtain an accurate overall intensity value. For example, since the green color component carries most intensity information, the green color component for each pixel can be used alone to identify the bit value.

In one embodiment, the video frames are decoded first in separate image files and then the magic pixels and particular frame numbers are embedded in each image in the first eight pixels (24 bytes assuming BGR24 encoding). It might happen that some protocols will perform video optimization and discard very small changes, to only send significant updates to the video frame with respect to the previous video frame. Hence, to avoid losing information due to video optimization, random filler 540 is included in macro block 534, where random filler 540 is different from frame to frame. By customizing the video, each frame is sent with the random filler, the marker, and the frame number. Finally, the image files are encoded using lossless compression to make the customized video with embedded meta-data.

In another embodiment, the encoding of video frames is done "on the fly," that is, the encoding of the video frame is done as the video data is transmitted to the client. In yet another embodiment, the encoding of the video frames can be done "on the fly" and upon request by an operator. This allows the operator to turn on and off the encoding in order to obtain video quality measurements on a particular client at will. This can be useful to check if video delivery supports a desired service level that meets a required Service Level Agreement (SLA).

In another embodiment, an algorithm searches for magic pixels in the video stream. Since there is a constant stream of updates from the server side, there can be a significant performance overhead associated with searching for magic pixels in every update. In another embodiment, a rectangle of the screen, where the video will likely to be played, is examined for the presence of magic pixels. Only if a video update rectangle overlaps the predefined area where the magix pixels may be, the video update is scanned for magic pixels. In one embodiment, the magic pixels need to be located once, since the location of magic pixels will not change over the duration of the video playback. In addition, magic pixels are searched in a video update if the update rectangle is bigger than the video screen, otherwise the update rectangle is scanned.

In one embodiment, the following pattern of 9 bytes is searched for when locating the magic pixels:

bytes 2, 4 and 6 have a value bigger than an upper threshold; and bytes 0, 1, 3, 5, 7, and 8 have a value smaller than a lower threshold.

Once the pattern is found, the next 15 bytes must meet the following pattern:

bytes 0 to 14 have a value less than a lower threshold; or bytes 0 to 14 have a value bigger than an upper threshold.

If these two constraints are satisfied at some particular pixel location, this location is used to find the frame numbers in incoming video frames. The values for the lower and upper thresholds are selected to control false positives (e.g., 0xa0 and 0x50 respectively, but other values are also possible). The frame number is obtained by scanning the next 15 bytes as follows:

If a pixel byte has a value bigger than 0x80, a bit value of '1' is assumed, and a bit value of '0' if the pixel byte has a value smaller than, or equal to, 0x80.

The 15 bit values are combined to form the frame number.

It is noted that the above encoding is exemplary and many modifications thereto are contemplated, and are well within the scope of the invention. For example, the previously described process can be used in video data with different color depth and different number of encoded bits per pixel, or different patterns of bytes may be used to obtain the frame number.

More details on video performance measuring techniques can be found in U.S. Pat. No. 7,831,661, issued Nov. 9, 2010, and entitled "MEASURING CLIENT INTERACTIVE PERFORMANCE USING A DISPLAY CHANNEL", and U.S. application Ser. No. 12/337,895, filed on Dec. 18, 2008, and entitled "MEASURING REMOTE VIDEO PLAYBACK PERFORMANCE WITH EMBEDDED ENCODED PIXELS", which are incorporated herein by reference.

Figure 5:
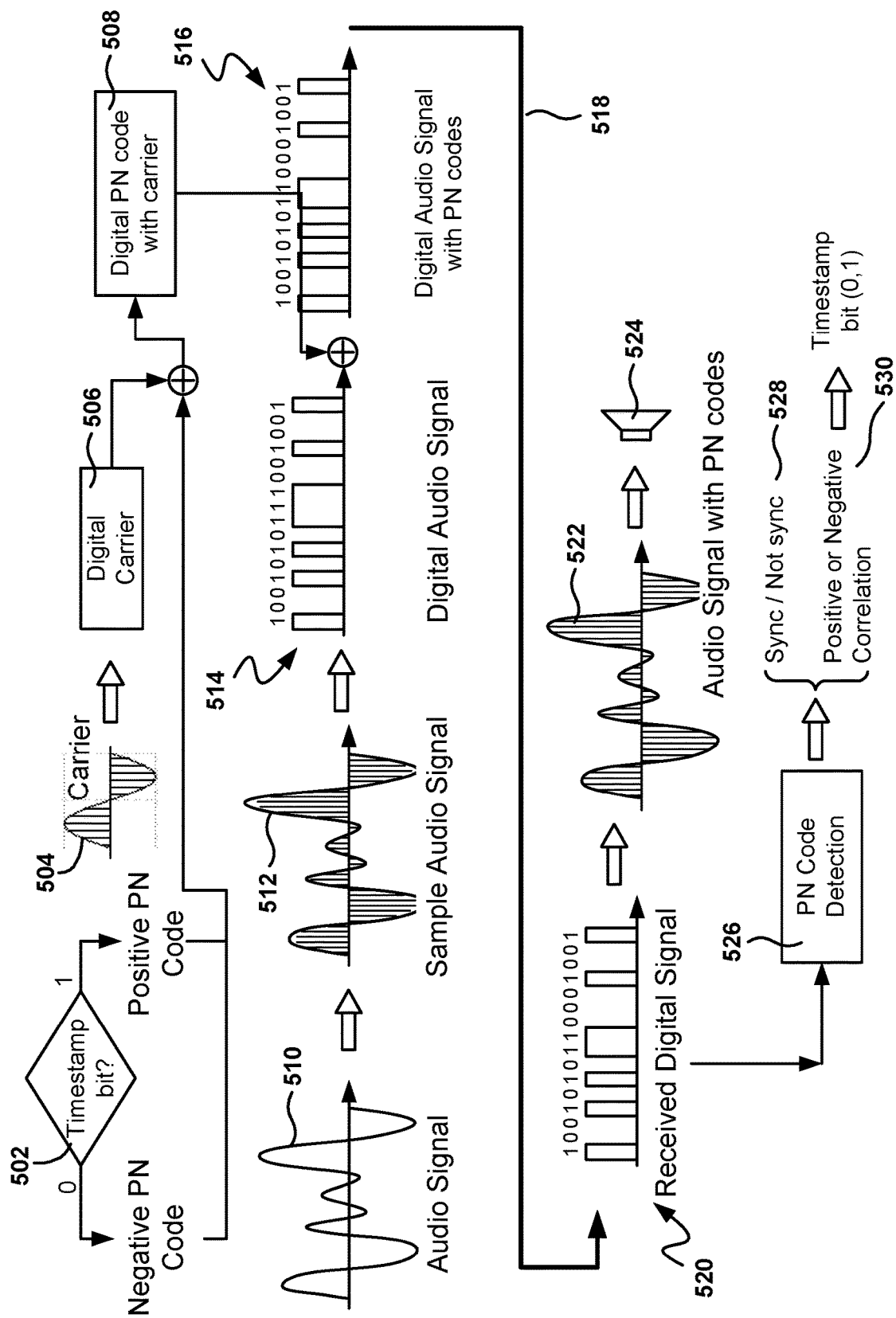
FIG. 5 illustrates the process of inserting and extracting pseudo noise (PN) codes in a spread spectrum transmission environment, according to one embodiment.

FIG. 5 illustrates the process of inserting and extracting pseudo noise (PN) codes in a spread spectrum transmission environment, according to one embodiment. In the operational environment with active users, if an administrator desires to keep real-time track of the users' experience, it is possible to run a small application on the host that inserted markers into the host's output audio stream. In this scenario, there would have to be minimal perturbation to the original audio stream by the insertion of the markers. The advantage of this approach is that the administrator can use this real-time quality information to identify and remedy problems before the user is inconvenienced and has to file a complaint.

A simple method to measure audio quality is to periodically insert samples or markers in the audio stream before transmission to the endpoint device, and then simply locate the markers on the endpoint device. This provides a measure of how fast the audio stream is progressing, and a measure indicating if the inserted markers are being received correctly. However, the modifications incurred by the audio stream during transmission make it difficult, if not impossible, to accurately recover these timing markers. It is necessary to "harden" the markers, such that the markers are more resilient to modifications incurred during transit.

In order to enable audio-video synchronization at a necessary granularity (e.g., 100 ms) it is not sufficient to insert infrequent periodic markers every second or so. For a typical audio stream (e.g., 44.1 KHz), it is necessary to detect alignment within about 4500 samples. Further, to prevent the introduction of aliasing (e.g., from jitter or replication) it is not sufficient to insert a simple marker every 4500 samples. Rather, each marker must be uniquely identifiable, at least within a sufficiently large time period to eliminate common aliasing concerns. As a result, there are only 4500 samples available to encode a unique timestamp that can withstand the following sequence of events that can be encountered in the VDI environment: MP3 compression (after offline marker insertion); MP3 decompression; playback via a typical audio tool; compression by the VDI transport protocol; network congestion (e.g., packet loss and jitter;) realization on the endpoint device; etc.

To avoid this problem, timestamps must be hardened. One bit of the timestamp cannot be entrusted to a single bit of audio data, or even to a single sample of the audio stream. Rather, it is necessary to spread the timestamp information over multiple samples, such that, even in the presence of the significant modification of the underlying audio stream, the timestamps can be recovered. To achieve spreading, spread spectrum (SS) techniques can be utilized. Spread spectrum signals use special fast codes, often called pseudo-noise (PN) codes, which run at many times the information bandwidth or data rate. The rate of the PN code can range from around 50 times to over 1000 times the information data rate, spreading each bit of information data across multiple bits of the PN code (50 to 1000 bits). The faster the code, the greater the spreading, and the more robust the information encoding is. As each information bit is mapped to a PN code that spans hundreds of audio samples, it is possible for a significant number of audio samples to be missing or corrupted, but the code and the information carried can still be recovered. The ratio of the code rate to the information bit rate is called the spreading factor or the processing gain.

A SS receiver uses a locally generated replica PN code and a receiver correlator to separate only the desired coded information from all possible signals. A SS correlator can be thought of as a very special matched filter, as the SS correlator responds only to signals that are encoded with a pseudo noise code that matches its own code. Thus, an SS correlator can be tuned to different codes simply by changing its local code. This correlator does not respond to man-made, natural or artificial noise or interference, the correlator responds only to SS signals with identical matched signal characteristics and encoded with the identical PN code.

The insertion of timestamps includes an operation for generating a PN code. The timestamps contain a plurality of bits, and each bit is sent separately as a PN code. The timestamp data is used to modulate the k-bit PN code (i.e., the timestamp data is spread.) The k-bit PN code is repeated for the duration of the audio stream. In operation 502, the method checks if the bit being sent is a logical 0 or a logical 1. If the bit is a logical 0, a negative version of the PN code is used, and if the bit is a logical 1, a positive version of the PN code is used. It is noted that PN codes have the property that the receiver can detect a positive or a negative correlation of the received signal with the PN codes. This property is used to encode a 0 or a 1 bit when using the PN codes. The resulting signal modulates a digital carrier 506, which is obtained by sampling an analog carrier 504, resulting in digital PN code with carrier signal 508.

For example, if a timestamp consists of a sequence of bits 0110 (without using markers), this timestamp is spread across 4 repeats of the PN code, with each instance of the code being modulated by a successive bit of the timestamp. If the timestamp bit is a 1, an instance of the PN code is emitted, whereas if the timestamp bit is a 0, a negated version of the PN code is emitted. Thus, for the above timestamp, −++− versions of the PN code are generated.

Audio signal 510 is sampled 512 to obtain a digital form of the audio signal 514. The digital PN code with carrier is incorporated into the original digital audio stream 514 to obtain a digital audio signal with PN codes 516, also referred to herein as a modulated audio signal, and then transmitted to the client. At the client, the received digital signal 520 is used for playing audio 522 in speaker 524.

The recovery of the timestamps includes the generation of a PN code that matches the PN code used during the generation of the modified audio stream. PN code detection module 526, at the receiver, acquires the received code and locks to the received code. The PN code detection module 526 compares its copy of the PN code against the received digital stream. When an unmodified version of the PN code is observed, the receiver knows that a 1 was transmitted, whereas if a negated version is observed, then a 0 was transmitted. By repeating this process for successive timestamp bits, the receiver gradually recreates the transmitted timestamp by concatenating the received timestamp bits.

The timestamp bit detection is performed by undertaking a correlation operation, where the received stream is correlated against the known PN code. These special PN codes have a critical property, the periodic autocorrelation function has a peak at 0 shift and a value of 0 elsewhere, i.e., there is a significant spike in correlation when the two codes are precisely aligned. A misalignment of the codes, by as little as a single sample, results in a significantly diminished degree of correlation. Accordingly, to locate a PN code in the received stream, the receiver needs to gradually advance its PN code across the received stream and recalculate the correlation after each sample-by-sample move. When the correlation exceeds a predefined threshold, the code in the audio stream has been located or acquired. Alternatively, rather than using a preset threshold, the code can be moved across a predefined window of the audio stream and the maximum correlation observed deemed to represent the location of the code.

Once the code has been locked, the receiver can proceed across the audio stream, determine where a positive or negative version of the code was transmitted (indicated by whether the result of the correlation operation is positive or negative), and recover the timestamp bits that can then be used to determine how far the audio stream has advanced and whether it is synchronized with the corresponding video sequence. If the correlation is positive, the system determines that a timestamp bit with a value of 1 has been received, and a bit with a value of 0 otherwise. A plurality of timestamps bits are combined to form a timestamp. In another embodiment, the encoding of the timestamp bit alternates. For example, a logic 1 is encoded with a positive version of the PN code in a first bit, and a logic 1 is encoded with a negative version of the PN code in the encoding of the bit following the first bit.

It should be noted that the embodiments illustrated in FIG. 5 are exemplary methods for inserting PN codes in a signal. Other embodiments may utilize different timestamps, encode 1 bits with the negative version of the PN code, use PN codes that are more or less "spread", modulate signals in the analog or digital domain, etc. The embodiments illustrated herein should therefore not be interpreted to be exclusive or limiting, but rather exemplary or illustrative. In addition, embodiments of the invention are presented here with reference to audio signals, but the same principles can be used to embed markers in video signals. More details on audio time-stamping techniques can be found in U.S. application Ser. No. 12/942,393, filed on Nov. 9, 2010, and entitled "MONITORING AUDIO FIDELITY AND AUDIO-VIDEO SYNCHRONIZATION", which is incorporated herein by reference.

Figure 6:
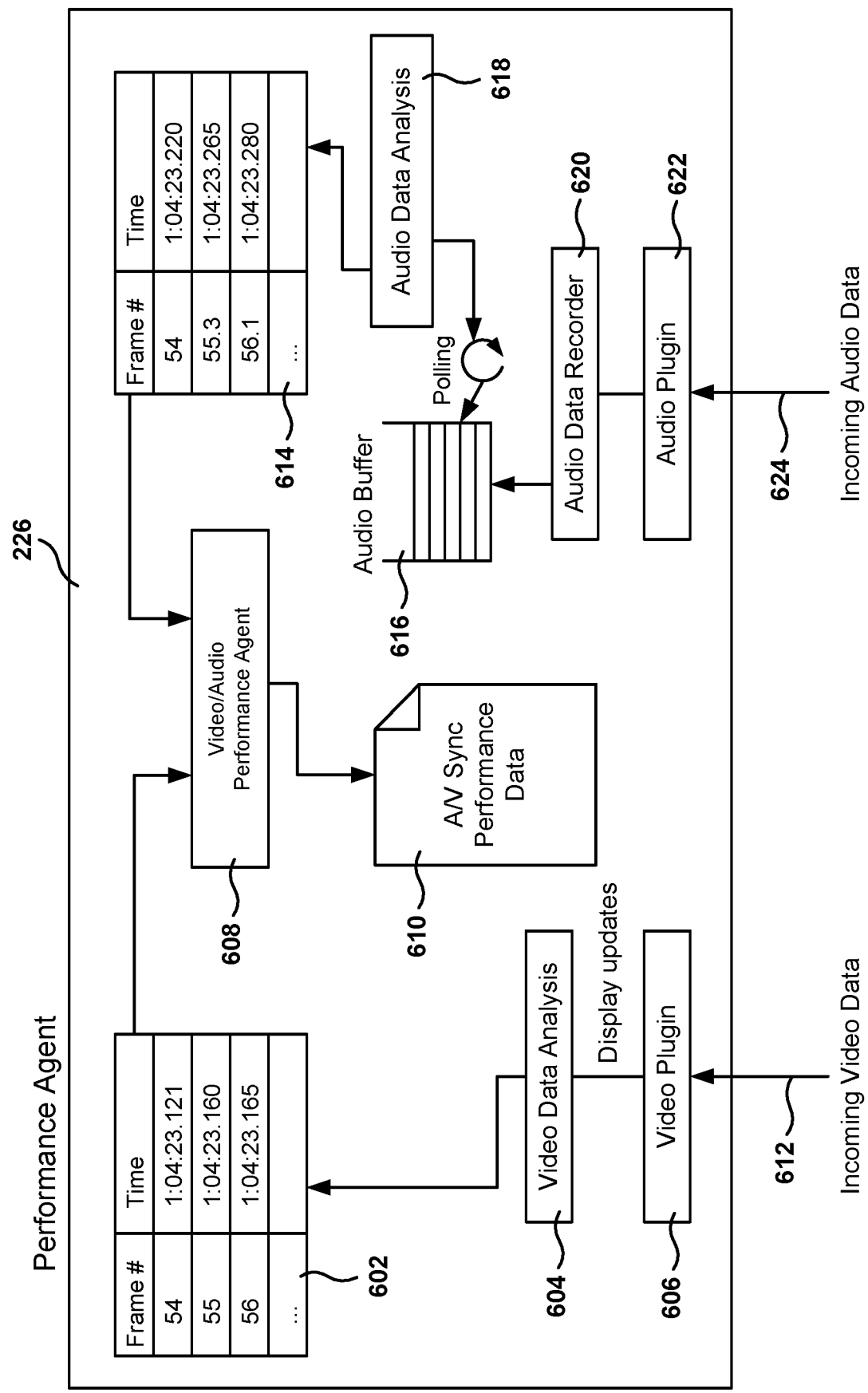
FIG. 6 is a simplified schematic diagram of the Performance Agent at the remote desktop, according to one embodiment.

FIG. 6 is a simplified schematic diagram of the Performance Agent 226 at the remote desktop, according to one embodiment. As previously described, the multimedia stream delivered to the remote desktop is altered for the A/V performance measurements, as follows;

1) Split the multimedia stream in separate video and audio streams.
2) Insert video makers into the video stream.
3) Insert audio markers into the audio stream.
4) Transmit the video and audio streams separately to the remote desktop.
5) Extract the video and audio markers at the remote desktop.
6) Display the video stream on a display and reproduce the audio stream in one or more speakers.
4) Calculate performance metrics based on the extracted video and audio markers.

Video plugin 606 captures incoming video data 612, which includes video or display updates. Video data analysis 604 examines the incoming video data and extracts the frame numbers from the video frames received. In addition, video data analysis 604 stores the extracted video frame numbers in video performance log 602, together with the associated timestamps indicating the time that each video frame was received.

On the audio side, audio plugin 622 captures incoming audio data 624, and the audio data recorder 620 stores the incoming audio data 624 in audio buffer 616, together with the corresponding timestamp in which the data was received. Another module, (e.g., another thread), audio data analysis 618 periodically polls buffer 616 to extract the video frame numbers from the buffered audio data. In one embodiment, PN codes are used to embed timestamps in the audio data, as described above with reference to FIG. 5. In one embodiment, the buffer is polled every 50 ms, but other values are also possible. Find below, with reference to FIG. 7, a more detailed description regarding converting timestamps to frame numbers.

Audio data analysis 618 logs the audio data in audio performance log 614, which includes the video frame numbers associated with the received audio, and the corresponding time when the audio was received. Since the frame number is based on the timestamp, the frame number calculated may be a non-integer number, such as 55.3.

When analyzing audio fidelity, the absolute time an audio sample is received is not particularly important. The metric to be considered is the relative timing between samples. In contrast, when determining A/V synchronization, it is necessary to compare the absolute time an audio sample is played with the absolute time a video frame is rendered. Accordingly, the audio driver is polled at a higher frequency than when measuring audio performance alone. Since the PN codes have to be acquired, and the timestamps span several thousand audio samples, a large number of audio samples are buffered before recovering the timestamps.

Video/Audio performance agent 608 calculates the difference in the A/V synchronization by comparing the video timestamp and the audio timestamp for the same frame number. In one embodiment, the A/V synchronization is measured as the difference between the video timestamp and the audio timestamp for the same frame number. For example, in the embodiment of FIG. 6, frame 54 is associated with a video timestamp of 1:04:23.121 and an audio timestamp of 1:04:23.220. The A/V synchronization (also referred to as the level of de-synchronization) for frame 52 is equal to the difference of the timestamps, or 99 ms. The calculations are performed for a plurality of timestamps, and statistical analysis is performed to determine the A/V synchronization for the all or a portion of the multimedia stream delivery.

The synchronization results are stored as A/V Synchronization performance data 610, which is made available to one or more performance servers in the network. These performance servers compile the A/V Synchronization data for a plurality of remote clients to produce system level A/V synchronization performance metrics.

Some of the video frames or the audio timestamps may not be received at the remote desktop because of network or server problems. This missing data may also be used to produce performance metrics indicating the percentage of data that is received at the remote desktop.

Further, some of the frame numbers in the audio performance log can be non-integer. In this case, linear interpolation is used to calculate a timestamp for a related integer frame number that can be used for comparisons with the received video frame numbers. The linear interpolation (also referred to as extrapolation) can be made using the video frame rate (e.g., 25 frames/sec), which is communicated offline or sent within the audio stream. The data can be extrapolated linearly because the audio progresses at a constant rate. If there is silence in the audio, the audio data keeps coming indicating silence, or, in some cases, noise. The audio stream is always moving forward at a constant rate.

If a video has a certain frame rate, the fractional part of the frame number is used to calculate the amount of time required to deliver that fraction of the frame using the frame rate. The result is then subtracted to determine the time associated with the integer frame number. Alternatively, the integer frame number may be calculated by rounding up to the next higher integer by adding the corresponding amount of time.

For example, if the frame rate is 25 frames per second (i.e., 40 ms per frame), a corresponding integer frame number 55 is calculated based on frame number 55.3. The 0.3 fraction corresponds to 12 ms (40 ms×0.3). Thus, the interpolated frame 55 would have a timestamp of 1:04:23.253 (1:04:23.265-12 ms). It is noted that other embodiments may utilize different interpolating techniques, such as calculating the integer frame numbers based on two or more fractional frame numbers. The interpolation method described herein should therefore not be interpreted to be exclusive or limiting, but rather exemplary or illustrative.

The video frame rate can either be supplied directly to the audio processing tool, or encoded directly in the audio stream along with the other time stamps. In one embodiment, the video frame rate is encoded at the start of the audio stream. However, since this would be a one-time event, if this video frame rate is corrupted, the information is lost. In another embodiment, the video frame rate is sent periodically (e.g., at each timestamp wrap-around event). In another embodiment, the audio data is embedded with markers indicating the video frame. In this case, it is not necessary to convert the timestamps to video frames, as the video frames received within the audio are already available.

FIG. 7 illustrates a method for calculating video frame numbers associated with audio markers, according to one embodiment. In one embodiment, the audio timestamps do not directly provide video frame numbers, nor are precisely aligned with frame changes. Accordingly, a frame number is calculated based on the audio timestamps. The frame rate of the video, R, is known, and the audio timestamps provide the time, relative to the start of the video, at which each audio sample should have been played. Thus, the frame number is calculated using the video frame rate R and the timestamps.

Audio analysis time 702 indicates the sampling times of the audio signal (e.g., see polling of audio buffer 616 by audio data analysis 618 in FIG. 6). In the embodiment of FIG. 6, four timestamps 704 (j, k, l, and m) are detected in the incoming audio stream between sampling times $t_1$ and $t_2$. The video relative times $T_i$ 706 are calculated by apportioning the times for the samples between times t1 and t2, resulting in times $T_j$–$T_m$, which are times with reference to the starting time $T_0$ of the multimedia stream.

Frame number $F_i$ 710 is calculated by multiplying the video relative time $T_i$ by the video frame rate R, as shown in the equation $F_i = T_i \cdot R$.

Accordingly, $F_j = T_j \cdot R$, $F_k = T_k \cdot R$, etc. Once the frame numbers are calculated, the timestamps for the video and the audio streams are compared, as described above.

FIGS. 8A-8F illustrate several embodiments for error detection and correction of timestamps embedded in a digital audio stream. FIG. 8A illustrates the rollover of a timestamp. In one embodiment, the timestamp counter includes eight bits, with the first and last bits in the counter set constant at a value of logical 0. Therefore, there are only 64 unique timestamp values available, going from 0 to 126 in increments of 2 (because the last bit is always 0). It is noted that the embodiment of FIG. 8A is exemplary, and other types of counters can be implemented, such as counters using more bits for the timestamp, counters with other bit values set to a constant value, counters that use all the bits for the timestamp counter, etc. The embodiment illustrated in FIG. 8A should therefore not be interpreted to be exclusive or limiting, but rather exemplary or illustrative.

If a timestamp is required each 100 ms, the timestamp repeat time is only about 6 seconds, which may be too short to catch all potential aliasing conditions during experimentation. As a result, in one embodiment, a two level timing system is utilized. FIG. 8B illustrates the use of a counter of rollovers of the timestamps, also referred to herein as a wrap arounds. The timestamp value of 0 is use to insert a rollover counter instead of the 0 value (see timestamps 802, 804, and 806). Via this mechanism, many forms of aliasing are detected within a 6 minute window.

Since missing or corrupted rollovers may seriously impact the timestamping of audio frames, error correction techniques are used in one embodiment. If there is an abrupt reset in the timestamps, e.g. 118, 120, 6 . . . , the system may assume the occurrence of a rollover or a corrupted timestamp. Additional hardening techniques can be utilized to overcome incorrect timestamps. FIG. 8C illustrates the detection of a corrupted timestamp based on the examination of a sequence of timestamps. The sequence of timestamps 2, 5, 6, 8, 12, shows that timestamp 808 with a value of 5 is out of order when compared to the other timestamps. The timestamp with value 5 is adjusted to a value of 4, the value that corresponds between timestamps with values 2 and 6. In another embodiment, Error-Correcting Codes (ECC) are used to correct timestamps. In yet another embodiment, one or more parity bits are used to detect corrupted timestamps.

The greater the delta between the timestamps prior to a wrap-around event and the point at which a wrap-around is expected, the greater the chance the event is erroneous (especially, if the timestamps are not separated by erroneous samples in which PN codes were not detected). FIG. 8D illustrates the detection of an early timestamp rollover. The sequence of timestamps with values 42, 44, 46, 2 . . . , has been received. The timestamp 810 with a value of 2 is expected following timestamps 122, 124, 126, 2, when a wrap-around occurs, and the timestamp following 44 and 46 is expected to be 48. Therefore, the sequence of FIG. 8D is considered an early rollover, and timestamp 810 will be discarded or corrected.

If the timestamps following the wrap-around appear to align closely with the timestamps prior to the wrap-around, rather than the wrap-around itself, there is a significant chance that this event is erroneous. FIG. 8E shows timestamp sequence 42, 44, 46, 2, 50, 52 . . . . In a correct wrap-around, the values 48 is expected following the values 42, 44, and 46. Therefore, timestamp 812 with a value of 2 is incorrect.

If the value of the wrap-around timestamp is not the expected value, this indicates that the timestamp may be corrupted. This is especially true if a single-bit flip would better align the timestamp in the stream. For example, the sequence 42, 44, 46, 48, 18, 52, includes the value 18, which is a single bit-flip different from the expected value of 50 in the sequence. Thus, the timestamp with a value of 18 will be corrected to have a value of 50, which fits the overall trend.

Proximity to a prior rollover also generates suspicion that a rollover may be erroneous. For example, in the sequence 122, 124, 126, 2, 4, 6, 4, shown in FIG. 8F, timestamp 814 with a value of 4 is likely corrupted, because a correct wrap-around event occurred just a few audio samples previous.

In one embodiment, one or more of the error detection and correction techniques shown with reference to FIGS. 8A-8F are combined to determine whether an event is erroneous and how error correction is performed. Combining all of these indicators allows the elimination of erroneous timestamp rollover events in low quality audio environments, even without the use of hardening techniques discussed above. In the benchmark environment, this processing can be performed offline, allowing for a more detailed analysis, and providing much greater context in which the correctness of the timestamps can be considered. In live cloud deployments, real-time decisions maybe necessary based on the results of the analysis, arguing for the use of EC techniques to reduce the frequency of erroneous events and allowing a swifter response to problems.

Figure 9:
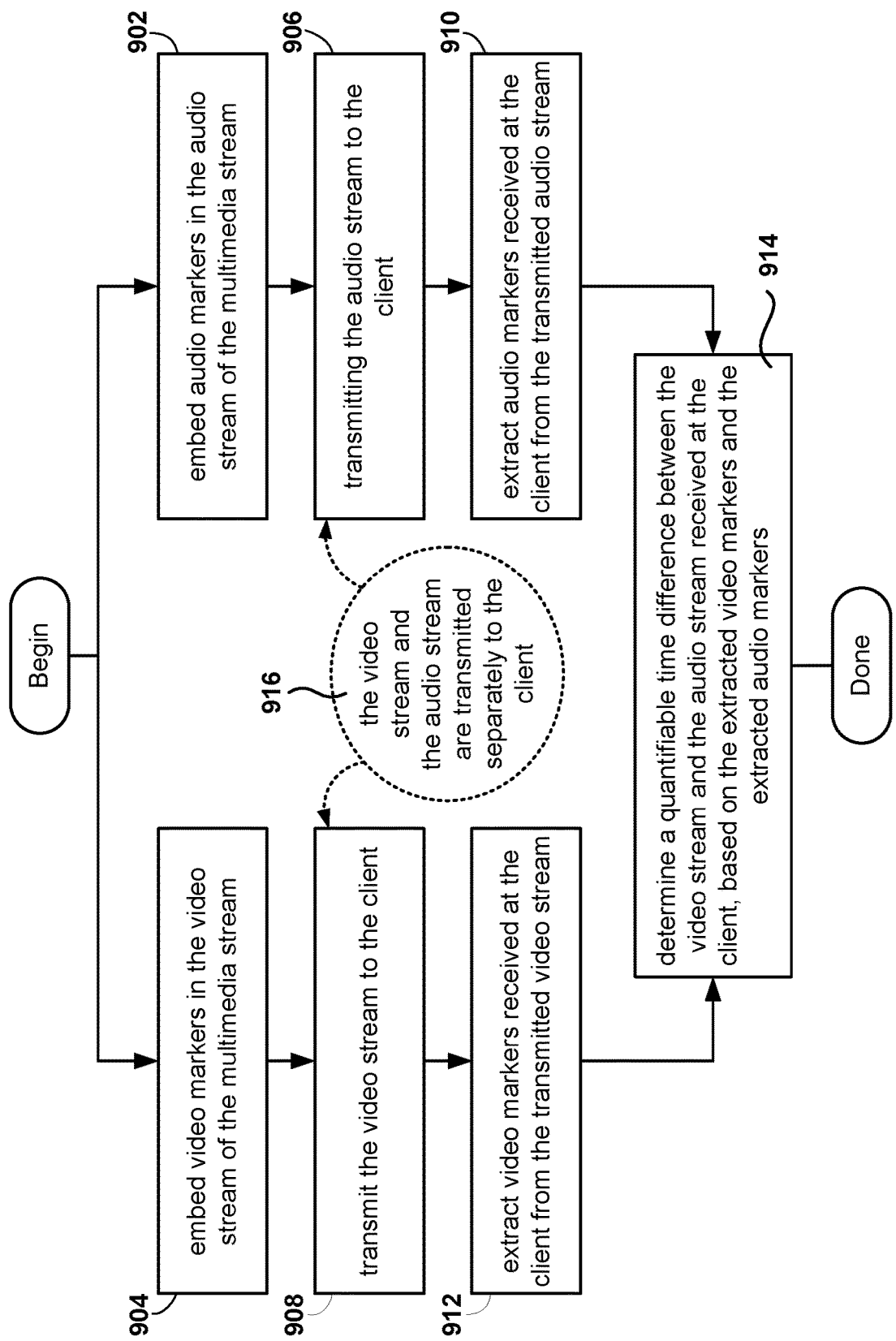
FIG. 9 shows an exemplary process flow for measuring quality of multimedia delivery to a client.

FIG. 9 shows the process flow for measuring quality of multimedia delivery to a client, in accordance with one embodiment of the invention. In operation 904, video markers are embedded in the video stream of the multimedia stream, and in operation 902, audio markers are embedded in the audio stream of the multimedia stream. Further, in operation 908, the video stream is transmitted to the client (e.g., remote desktop), and, in operation 906, the audio stream is transmitted to the client. The video stream and the audio streams are transmitted 916 separately to the client.

In operation 912, the video markers received at the client are extracted from the transmitted video stream, and, in operation 910, the audio markers received at the client are extracted from the transmitted audio stream. Further, in operation 914, a quantifiable time difference, between the video stream and the audio stream received at the client, is determined based on the extracted video markers and the extracted audio markers.

Figure 10:
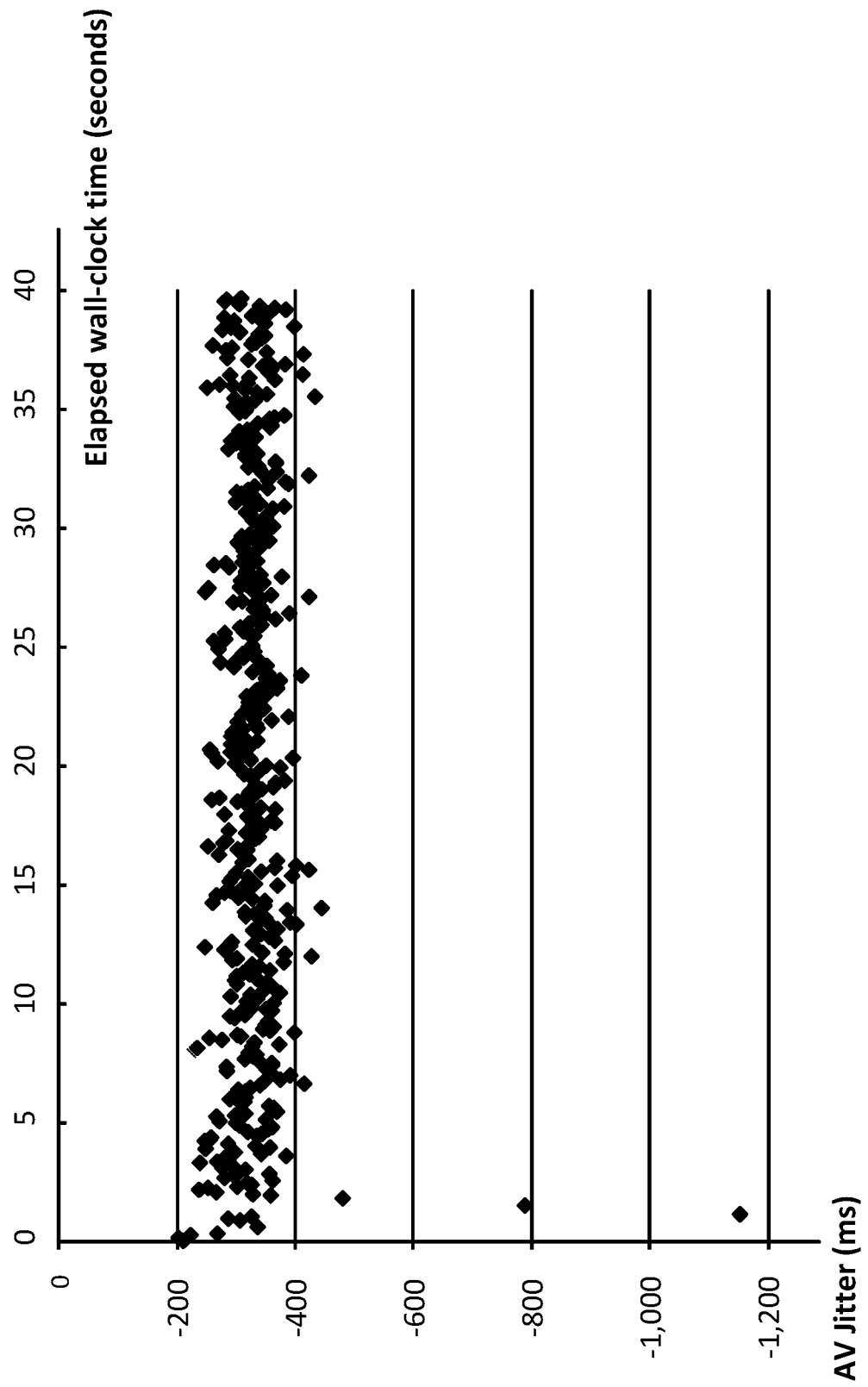
FIG. 10 shows Audio/Video synchronization measurements, according to one embodiment.

FIG. 10 shows Audio/Video synchronization measurements, according to one embodiment. FIG. 10 illustrates the A/V synchronization for video playback via VMware® View™. The horizontal axis represents the elapsed wall-clock time in seconds, and the vertical axis represents the A/V jitter in milliseconds. The average A/V drift is around 300 ms, which is higher than the 50 ms of drift measured for local playback of the same video, and higher than the 100 ms when drift becomes noticeable to a user. The precise frame-by-frame variation in the drift reported by the tool provides additional insight not obtainable subjective measurements, i.e., "eyeballing" the difference between the video and the audio.

The A/V synchronization metrics can be used, not only to generate warnings for administrators, but also to enhance automatic response to developing problems by tuning resource usage, throttling video frame-rates, down-sampling the audio stream, dynamically correcting the drift in the AV synchronization, etc. The A/V synchronization metrics are independent of any underlying problem in the delivery of multimedia, such as network failures, compression, firewalls, etc. Further, embodiments of the invention may be used for any type of video: videos with small frame-to-frame updates (e.g., a news broadcaster), or videos with large frame-to-frame changes (e.g., a waterfall, a celebration with confetti in the air). Thus, the A/V performance metrics are useful to assess performance under different conditions.

The performance metric may be evaluated and presented to administrator and/or users as simply an audio/video synchronization error, or this metric may be rolled into other performance metrics to evaluate a broader-based multimedia performance metric that takes into account such things as audio quality and video image quality, or latency. The synchronization error metric for a plurality of users can be rolled together to evaluate a system-wide performance metric. For example, quality metric such as "95% of users have an AV synchronization error of less than 300 ms" may be obtained by ranking the synchronization errors and identifying synchronization error value for which 95% of users have a smaller error. This system performance metric may be user-configured for and so that an alert may be raised to the administrator when the system synchronization error exceeds a predetermined threshold. In addition, alerts may also be generated when the performance of a user deteriorates, i.e., the synchronization error for the user exceeds a predetermined user performance threshold.

In one embodiment, the incoming audio and video data is captured via Application Programming Interfaces (API), that provide access to the data. Thus, the methods presented here can be used in any client-server delivery model, beyond virtual machines or remote desktops, where the client can be a personal computer, a laptop, a tablet computer, a smart phone, IP TV, a cable box, a portable game device, etc., as long as APIs are available to access the A/V data.

The embodiments presented here can also be utilized in MultiMedia Redirection (MMR) environments, where the audio and the video are sent together to the client, where they are separated. Since the audio and video are sent together, the A/V synchronization will be, in general, better in MMR than in systems where the audio and the video are sent separately. By measuring the performance for MMR and for non-MMR systems, a comparison may be established to determine how the A/V synchronization degrades due to the separate transmittal of audio and video.

Figure 11:
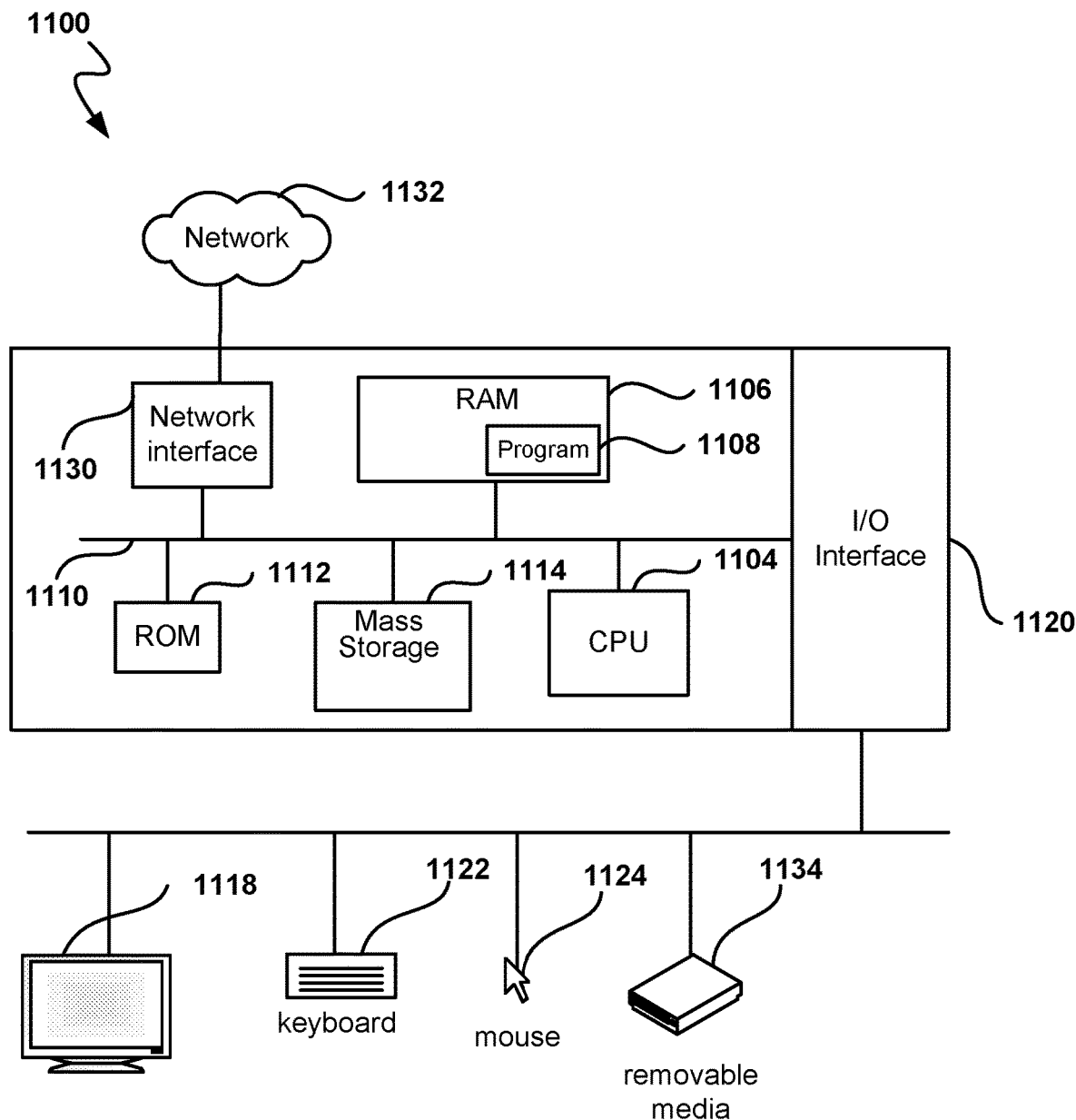
FIG. 11 is a simplified schematic diagram of a computer system for implementing embodiments of the present invention.

FIG. 11 is a simplified schematic diagram of a computer system for implementing embodiments of the present invention. It should be appreciated that the methods described herein may be performed with a digital processing system, such as a conventional, general-purpose computer system. Special purpose computers, which are designed or programmed to perform only one function may be used in the alternative. The computer system includes a central processing unit (CPU) 1104, which is coupled through bus 1110 to random access memory (RAM) 1106, read-only memory (ROM) 1112, and mass storage device 1114. Performance agent program 1108 resides in random access memory (RAM) 1106, but can also reside in mass storage 1114 or ROM 1112.

Mass storage device 1114 represents a persistent data storage device such as a floppy disc drive or a fixed disc drive, which may be local or remote. Network interface 1130 provides connections via network 1132, allowing communications with other devices. It should be appreciated that CPU 1104 may be embodied in a general-purpose processor, a special purpose processor, or a specially programmed logic device. Input/Output (I/O) interface provides communication with different peripherals and is connected with CPU 1104, RAM 1106, ROM 1112, and mass storage device 1114, through bus 1110. Sample peripherals include display 1118, keyboard 1122, cursor control 1124, removable media device 1134, etc.

Display 1118 is configured to display the user interfaces described herein. Keyboard 1122, cursor control 1124, removable media device 1134, and other peripherals are coupled to I/O interface 1120 in order to communicate information in command selections to CPU 1104. It should be appreciated that data to and from external devices may be communicated through I/O interface 1120. The invention can also be practiced in distributed computing environments where tasks are performed by remote processing devices that are linked through a wire-based or wireless network.

Embodiments of the present invention may be practiced with various computer system configurations including hand-held devices, microprocessor systems, microprocessor-based or programmable consumer electronics, minicomputers, mainframe computers and the like. The invention can also be practiced in distributed computing environments where tasks are performed by remote processing devices that are linked through a network.

With the above embodiments in mind, it should be understood that the invention can employ various computer-implemented operations involving data stored in computer systems. These operations are those requiring physical manipulation of physical quantities. Any of the operations described herein that form part of the invention are useful machine operations. The invention may relate to a device or an apparatus for performing these operations. The apparatus may be specially constructed for the required purpose, such as a special purpose computer. When defined as a special purpose computer, the computer can also perform other processing, program execution or routines that are not part of the special purpose, while still being capable of operating for the special purpose. Alternatively, the operations may be processed by a general purpose computer selectively activated or configured by one or more computer programs stored in the computer memory, cache, or obtained over a network. When data is obtained over a network the data maybe processed by other computers on the network, e.g., a cloud of computing resources.

The embodiments of the present invention can also be defined as a machine that transforms data from one state to another state. The transformed data can be saved to storage and then manipulated by a processor. The processor thus transforms the data from one thing to another. Still further, the methods can be processed by one or more machines or processors that can be connected over a network. The machines can also be virtualized to provide physical access to storage and processing power to one or more users, servers, or clients. Thus, the virtualized system should be considered a machine that can operate as one or more general purpose machines or be configured as a special purpose machine. Each machine, or virtual representation of a machine, can transform data from one state or thing to another, and can also process data, save data to storage, display the result, or communicate the result to another machine.

The invention can also be embodied as computer readable code on a computer readable medium. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the overlay operations are performed in the desired way.

Although the foregoing invention has been described in some detail for purposes of clarity of understanding, it will be apparent that certain changes and modifications can be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method comprising:
   receiving, at a client device, a separate video stream and an audio stream of multimedia content provided for presentation on a desktop view of the client device by a virtual desktop executing on a remote host computer;
   presenting the received video stream and audio stream in the desktop view of the client device;
   extracting one or more video markers encoded in the video stream;
   extracting one or more audio markers encoded in the audio stream;
   determining audio-video synchronization data for a plurality of video frames, wherein determining audio-video synchronization comprises:
   for each of a plurality of video frames:
      determining a video timestamp of a marker for the video frame;
      determining an audio timestamp of an audio marker for the video frame based on PN codes from the audio stream, comprising: correlating the received audio stream with the reference PN code to locate the PN codes in the audio stream, using positive and negative correlations of the PN codes in the audio stream relative to the reference PN code to determine respective timestamp bits, and combining timestamp bits to form the audio timestamp; and
      determining a difference between the video timestamp and the audio timestamp for the video frame to calculate a difference in audio-video synchronization; and providing the determined audio-video synchronization data determined for the plurality of video frames to a remote performance system, the audio-video synchronization data indicative of audio-video synchronization for at least a portion of the stream delivery to the client device.

2. The method of claim 1, wherein calculating a video frame associated with a particular audio marker comprises: obtaining a frame rate for the video stream and using the frame rate and the audio timestamp to determine which frame should correspond to the audio marker.

3. The method of claim 1, wherein a particular frame is associated with a fractional frame number based on a particular frame rate for the video stream, and wherein a timestamp for a particular frame is calculated using the fractional frame number including calculating an amount of time required to deliver that fraction of the frame at the frame rate and using that amount of time to determine a timestamp for the frame.

4. The method of claim 1, wherein the audio timestamp values include a rollover counter based on a repeat time for the audio timestamps.

5. The method of claim 1, wherein out of order audio timestamps are detected and corrected based on a comparison with other determined audio timestamps.

6. The method of claim 1, wherein an audio timestamp with an unexpected wrap-around value is detected, the audio timestamp is discarded from analysis.

7. The method of claim 1, wherein in response to providing the determined synchronization data to the performance system, subsequent portions of the multimedia content are provided with corrected synchronization.

8. The method of claim 1, wherein determining a timestamp for an audio marker comprises:
generating the reference PN code that corresponds to a PN code used to embed the audio markers in the audio stream; and
comparing the generated PN code against the received audio stream to determine correlations.

9. The method of claim 1, wherein the one or more video markers are extracted from a mirror buffer that holds a copy in memory of a frame buffer for the received video stream.

10. A system comprising:
a computer including at least one memory and at least one processor, the computer configured to interact with one or more servers and to perform operation comprising:
receiving, at a client device, a separate video stream and an audio stream of multimedia content provided for presentation on a desktop view of the client device by a virtual desktop executing on a remote host computer;
presenting the received video stream and audio stream in the desktop view of the client device;
extracting one or more video markers encoded in the video stream;
extracting one or more audio markers encoded in the audio stream;
determining audio-video synchronization data for a plurality of video frames, wherein determining audio-video synchronization comprises:
for each of a plurality of video frames:
determining a video timestamp of a marker for the video frame;
determining an audio timestamp of an audio marker for the video frame based on PN codes from the audio stream, comprising: correlating the received audio stream with the reference PN code to locate the PN codes in the audio stream, using positive and negative correlations of the PN codes in the audio stream relative to the reference PN code to determine respective timestamp bits, and combining timestamp bits to form the audio timestamp; and
determining a difference between the video timestamp and the audio timestamp for the video frame to calculate a difference in audio-video synchronization; and
providing the determined audio-video synchronization data determined for the plurality of video frames to a remote performance system, the audio-video synchronization data indicative of audio-video synchronization for at least a portion of the stream delivery to the client device.

11. The system of claim 10, wherein calculating a video frame associated with a particular audio marker comprises: obtaining a frame rate for the video stream and using the frame rate and the audio timestamp to determine which frame should correspond to the audio marker.

12. The system of claim 10, wherein a particular frame is associated with a fractional frame number based on a particular frame rate for the video stream, and wherein a timestamp for a particular frame is calculated using the fractional frame number including calculating an amount of time required to deliver that fraction of the frame at the frame rate and using that amount of time to determine a timestamp for the frame.

13. The system of claim 10, wherein the audio timestamp values include a rollover counter based on a repeat time for the audio timestamps.

14. The system of claim 10, wherein out of order audio timestamps are detected and corrected based on a comparison with other determined audio timestamps.

15. The system of claim 10, wherein an audio timestamp with an unexpected wrap-around value is detected, the audio timestamp is discarded from analysis.

16. The system of claim 10, wherein in response to providing the determined synchronization data to the performance system, subsequent portions of the multimedia content are provided with corrected synchronization.

17. The system of claim 10, wherein determining a timestamp for an audio marker comprises:
generating the reference PN code that corresponds to a PN code used to embed the audio markers in the audio stream; and
comparing the generated PN code against the received audio stream to determine correlations.

18. The system of claim 10, wherein the one or more video markers are extracted from a mirror buffer that holds a copy in memory of a frame buffer for the received video stream.

19. A method comprising:
obtaining a multimedia stream at a virtual desktop, wherein the multimedia stream is separated into a video stream and an audio stream;
embedding video markers in video frames of the video stream;
embedding audio markers in the audio stream, the audio markers including a timestamp indicating a time elapsed from a start of the multimedia stream, wherein embedding audio markers inserting one or more timestamps in the audio stream, wherein each timestamp is represented by a sequence of bits and each bit is represented by a respective PN code instance, and wherein inserting a particular timestamp includes sequentially inserting a plurality of PN codes into the audio stream to represent each bit of the timestamp including inserting a positive version of the PN code to embed a timestamp bit of the sequence of bits with a first logical value and inserting a negative version of the PN code to embed a timestamp bit of the sequence of bits with a second logical value; and transmitting the video stream and the audio stream separately to a desktop view window presented on a client device.

20. The method of claim 19, wherein embedding video markers includes:

inserting each video marker in a frame of the video stream, the video marker including a preconfigured sequence of pixels and being followed by a frame number encoded in pixel data.

21. The method of claim 19, wherein embedding the audio markers further includes:

embedding video frame numbers of video frames associated with the audio markers.

22. The method of claim 19, wherein each video marker including a frame number of a corresponding video frame.

23. The method of claim 19, further comprising:

receiving audio-video synchronization data from the client device, the audio-video synchronization data being determined by the client device based on the video and audio markers; and determining a level of de-synchronization between the video stream and the audio stream for one or more video frames based on the audio-video synchronization data.

24. The method of claim 19, further comprising:

receiving audio-video synchronization data from each of a plurality of clients and using the received audio-video synchronization data to generate system level audio-video synchronization performance metrics.

* * * * *